US012585854B2

(12) United States Patent

Li et al.

(10) Patent No.: US 12,585,854 B2
(45) Date of Patent: Mar. 24, 2026

(54) CIRCUIT CELLS HAVING POWER GRID STUBS

(71) Applicant: TAIWAN SEMICONDUCTOR MANUFACTURING COMPANY, LTD., Hsinchu (TW)

(72) Inventors: Johnny Chiahao Li, Hsinchu (TW); Sheng-Hsiung Chen, Hsinchu (TW); Hui-Zhong Zhuang, Hsinchu (TW); Jerry Chang Jui Kao, Hsinchu (TW); Xiangdong Chen, Hsinchu (TW); Chung-Hsing Wang, Hsinchu (TW)

(73) Assignee: TAIWAN SEMICONDUCTOR MANUFACTURING COMPANY, LTD., Hsincu (TW)

( * ) Notice: Subject to any disclaimer, the term of this patent is extended or adjusted under 35 U.S.C. 154(b) by 774 days.

(21) Appl. No.: 17/821,567

(22) Filed: Aug. 23, 2022

(65) Prior Publication Data

US 2024/0070364 A1 Feb. 29, 2024

(51) Int. Cl.
| | |
|---|---|
| G06F 30/392 | (2020.01) |
| G06F 30/394 | (2020.01) |
| G06F 119/06 | (2020.01) |
| G06F 119/18 | (2020.01) |

(52) U.S. Cl.
CPC .......... G06F 30/392 (2020.01); G06F 30/394 (2020.01); G06F 2119/06 (2020.01); G06F 2119/18 (2020.01)

(58) Field of Classification Search
USPC ......................................................... 716/120
See application file for complete search history.

(56) References Cited

U.S. PATENT DOCUMENTS

| | | | |
|---|---|---|---|
| 2020/0105671 A1* | 4/2020 | Lai ........................ | G06F 30/394 |
| 2021/0408011 A1* | 12/2021 | Fujiwara ................ | H10D 89/10 |
| 2022/0238442 A1* | 7/2022 | Sio ........................ | H10D 84/834 |

* cited by examiner

*Primary Examiner* — Mohammed Alam
(74) *Attorney, Agent, or Firm* — Hauptman Ham, LLP

(57) ABSTRACT

An integrated circuit includes a first power rail and a second power rail extending in a first direction, and a first power grid stub connected to the first power rail through a first via-connector. The integrated circuit also includes a first vertical conducting line extending in a second direction in a circuit cell between a first vertical cell boundary and a second vertical cell boundary. The first vertical conducting line and the first power grid stub are in a same metal layer and aligned with each other along the second direction.

20 Claims, 26 Drawing Sheets

100

P'
1t3A

Q'
1t2An
1g2ABn
1t3Bn
1t1B
1t2B

1t2Ap    1t1A
1g1A    109g

1g2Ap
1g2Bp

A    TR1    1g1B
TR2
TR3
A'    TR4    1g3B
TR5    1t4B
TR6
TR7    1g3Bp
TR8
TR9
TR10
TR11    1g10B
1t11B

1t2Ap
1g2Ap
1g3A
1t4A

1t11A
1g10A
101g

P
82p
Q
82n
84n
84p

X
Y

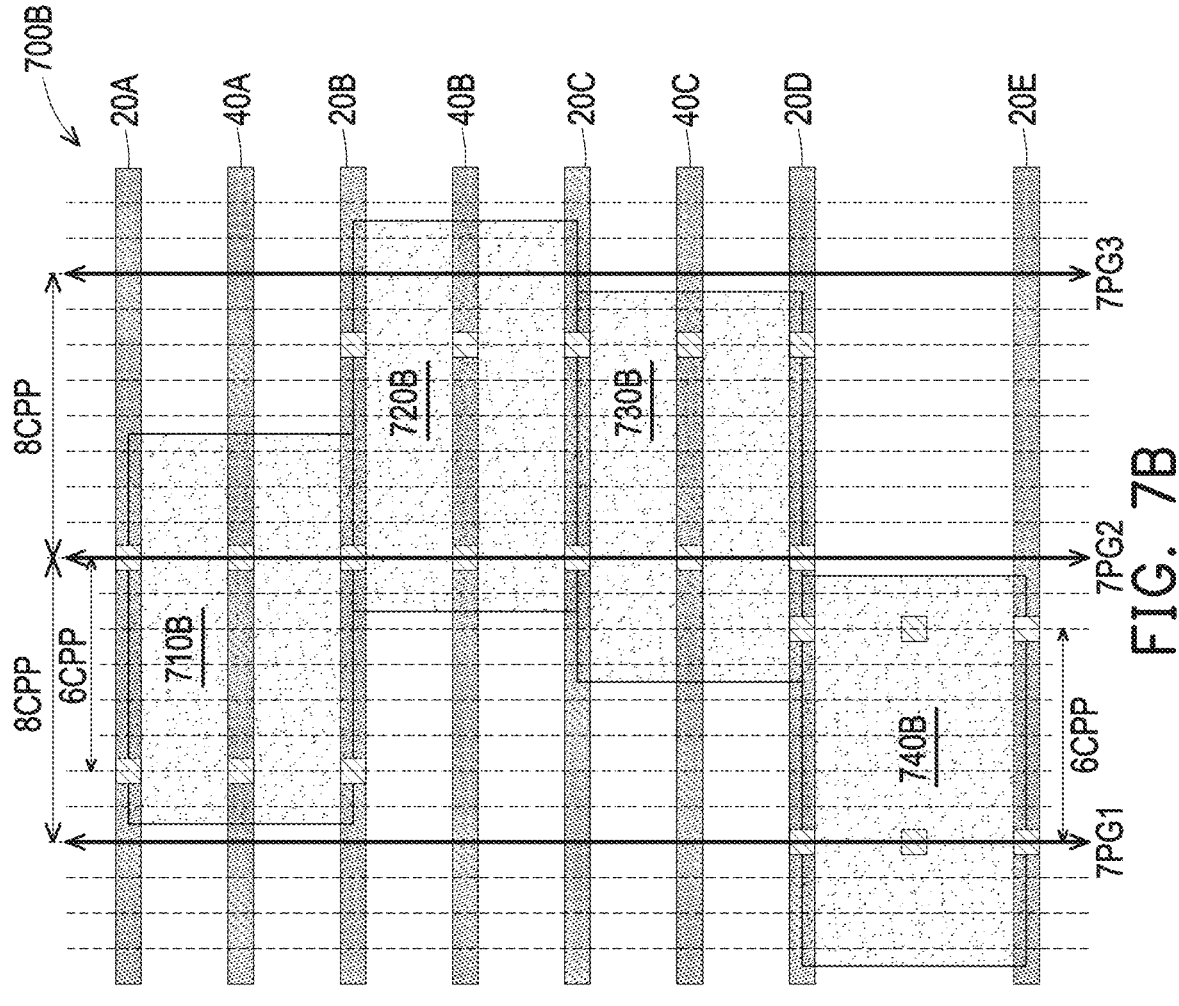
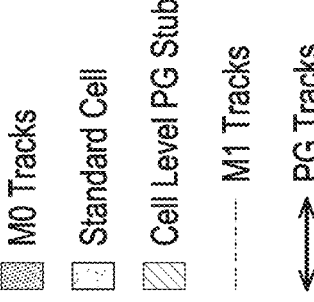
FIG. 7B

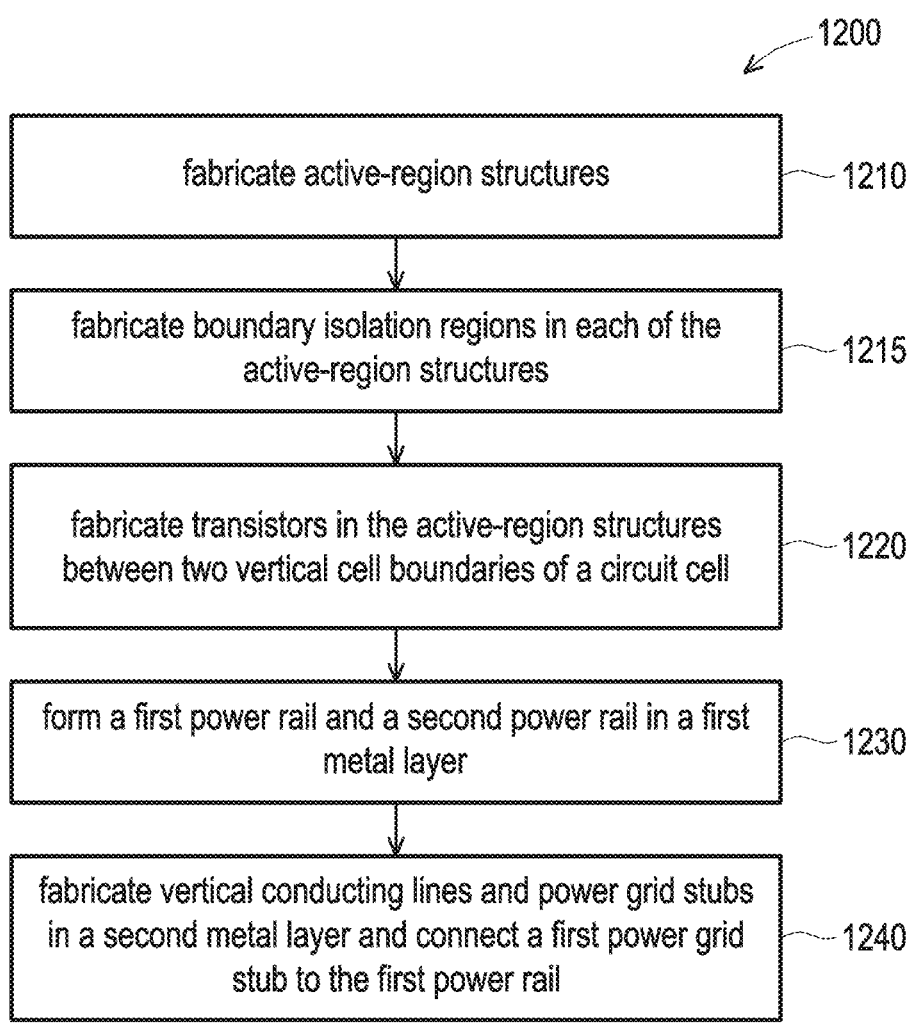

1200

| fabricate active-region structures | 1210 |

| fabricate boundary isolation regions in each of the active-region structures | 1215 |

| fabricate transistors in the active-region structures between two vertical cell boundaries of a circuit cell | 1220 |

| form a first power rail and a second power rail in a first metal layer | 1230 |

| fabricate vertical conducting lines and power grid stubs in a second metal layer and connect a first power grid stub to the first power rail | 1240 |

1304
Memory

1306
Instructions

1307
Standard Cell Library
including standard cells

1309
Layout Diagram(s)

1342
User Interface (UI)

1310
Input/Output
(I/O)

1302
Processor

1314
Network

1312
Network
Interface

CIRCUIT CELLS HAVING POWER GRID STUBS

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7A-7B are layout diagrams of an integrated circuit implemented with different horizontal distances between the power grid stubs, in accordance with some embodiments.

FIG. 12 is a flowchart of a method of manufacturing an integrated circuit, in accordance with some embodiments.

DETAILED DESCRIPTION

Figure 1A:
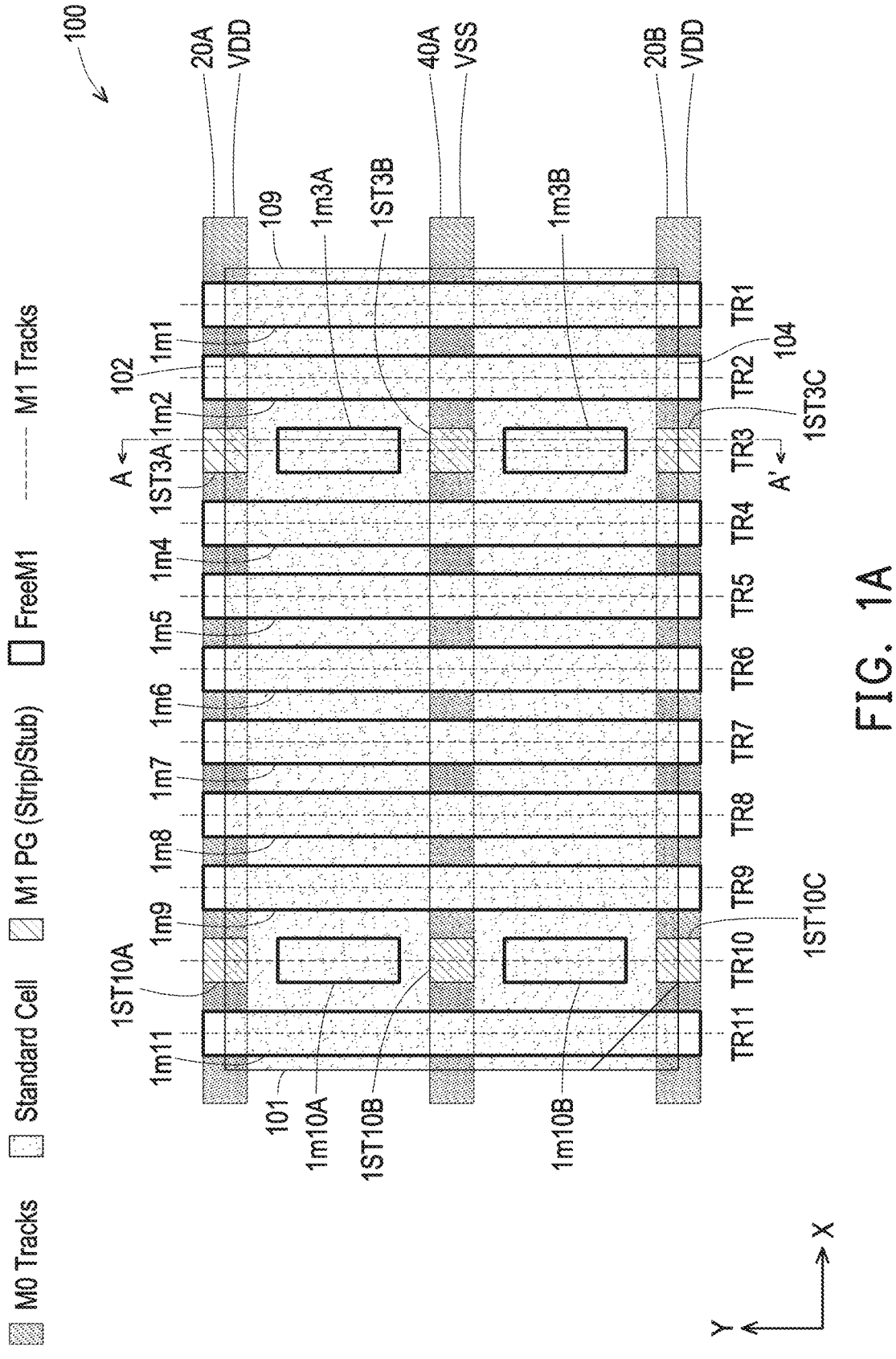
FIGS. 1A-1C are layout diagrams of a circuit cell, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, an integrated circuit includes a power rail extending in a X-direction in a first metal layer. A circuit cell in the integrated circuit includes a vertical conducting line in a second metal layer extending in a Y-direction between two vertical cell boundaries. The circuit cell further includes a power grid stub in the second metal layer which is aligned with the vertical conducting line along the Y-direction. The power grid stub is connected to the power rail through a via-connector. The circuit cell having one or more power grid stubs has an increased number of vertical conducting lines available for intra-cell routing, as compared with an alternative layout of the circuit cell in which power grid strips are implemented as substitutes for the power grid stubs. In some embodiments, an integrated circuit having circuit cells with power grid stubs may have improved circuit layout flexibility, as compared with the alternative in which the circuit cells in the integrated circuit have no power grid stubs.

Figure 1B:
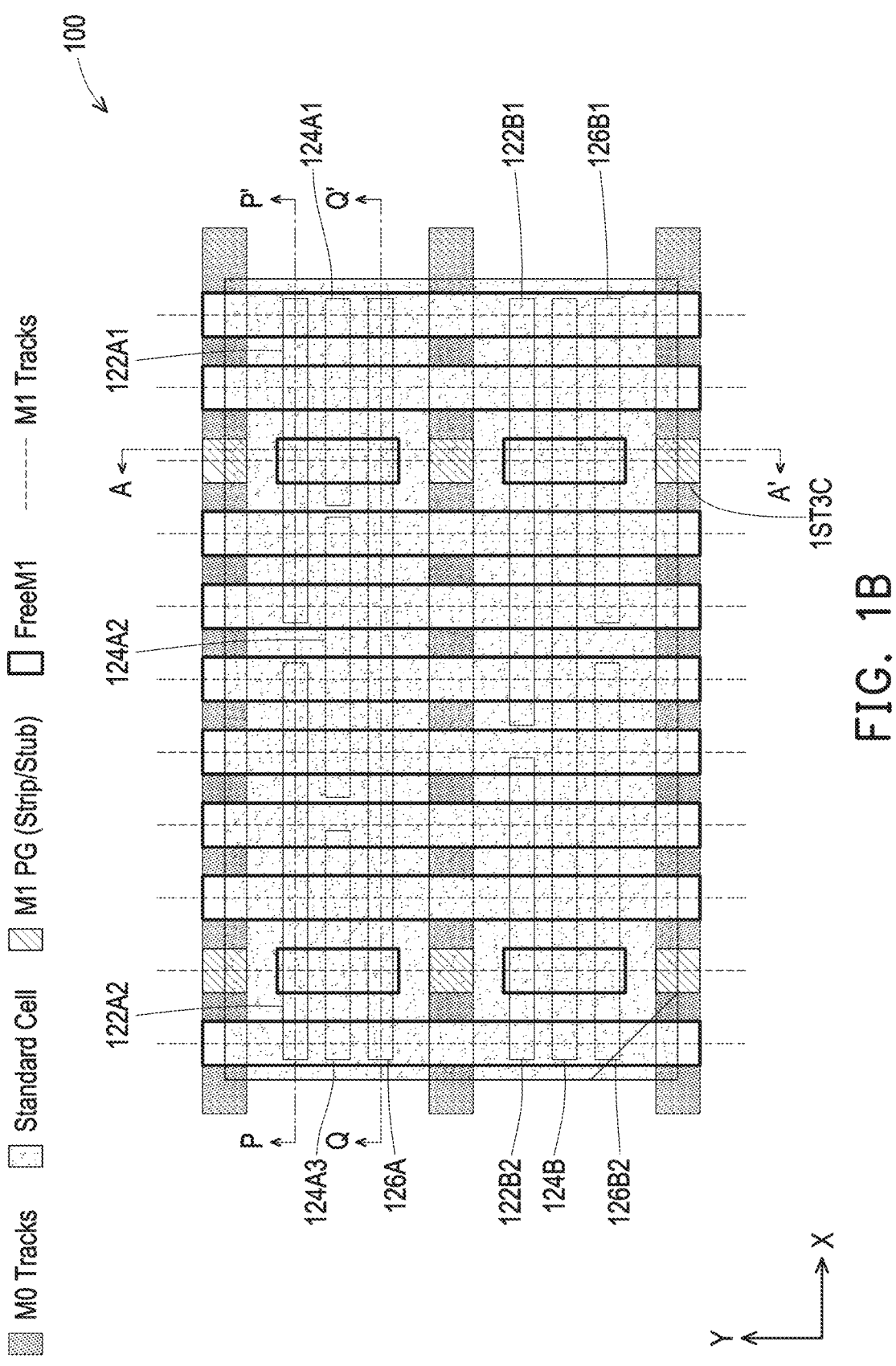
Figure 1C:
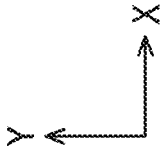

FIGS. 1A-1C are layout diagrams of a circuit cell 100, in accordance with some embodiments. The layout diagram of FIG. 1A includes layout patterns extending in the X-direction for specifying power rails 20A, 40A, and 20B, and layout patterns extending in the Y-direction for specifying vertical conducting lines $1m1$-$1m2$, $1m3A$-$1m3B$, $1m4$-$1m9$, $1m10A$-$1m10B$, and $1m11$. The layout diagram of FIG. 1A further includes layout patterns for specifying power grid stubs 1ST3A-1ST3C (which are aligned with the vertical conducting lines 1$m$3A and 1$m$3B) and layout patterns for specifying power grid stubs 1ST10A-1ST10C (which are aligned with the vertical conducting lines 1$m$10A and 1$m$10B). The circuit cell 100 is bounded in the X-direction by the vertical cell boundaries 101 and 109 and bounded in the Y-direction by the horizontal cell boundaries 102 and 104. The Y-direction is perpendicular to the X-direction.

The layout diagram of FIG. 1B includes layout patterns extending in the X-direction for specifying horizontal conducting lines 122A1-122A2, 124A1-122A3, 126A, 122B1-122B2, 124B, and 126B1-126B2, which are superimposed with the layout patterns in FIG. 1A. The layout diagram of FIG. 1C includes layout patterns extending in the X-direction for specifying active-region structures 82$p$, 82$n$, 84$n$, and 84$p$. The layout diagram of FIG. 1C also includes layout patterns extending in the Y-direction for specifying gate-conductors 1$g$1A-1$g$1B, 1$g$2Ap-1$g$2Bp, 1$g$2ABn, 1$g$3A-1$g$3B, and 1$g$10A-1$g$10B. The layout patterns for specifying gate-conductors between the gate-conductors 1$g$3A and 1$g$10A and for specifying gate-conductors between the gate-conductors 1$g$3B and 1$g$10B are not explicitly shown in the figure, for reasons of maintaining simplicity. The layout diagram of FIG. 1C further includes layout patterns extending in the Y-direction for specifying terminal-conductors 1$t$1A-1$t$1B, 1$t$2Ap-1$t$2An, 1$t$2B, 1$t$3A, 1$t$3Bn-1$t$3Bp, 1$t$4A-1$t$4B, and 1$t$11A-1$t$11B. The layout patterns for specifying terminal-conductors between the terminal-conductors 1$t$4A and 1$t$11A and for specifying terminal-conductors between the terminal-conductors 1$t$4B and 1$t$11B are not explicitly shown in the figure, for reasons of maintaining simplicity. The layout diagram of FIG. 1C still includes layout patterns extending in the Y-direction for specifying a dummy gate-conductor 101$g$ at the vertical cell boundary 101 and a dummy gate-conductor 109$g$ at the vertical cell boundary 109.

In the circuit cell 100 as specified by the layout diagram of FIG. 1C, some gate-conductors intersect the active-region structure 82$p$ or 84$p$ at the channel regions of various PMOS transistors while some gate-conductors intersect the active-region structure 82$n$ or 84$n$ at the channel regions of various NMOS transistors. In some embodiments, when the active-region structures 82$p$-84$p$ and 82$n$-84$n$ are formed with fin structures, the PMOS transistors formed in the active-region structures 82$p$-84$p$ and the NMOS transistors formed in the active-region structures 80$n$ are FinFETs. In some embodiments, when the active-region structures 82$p$-84$p$ and 82$n$-84$n$ are formed with nano-sheet structures, the PMOS transistors formed in the active-region structures 82$p$-84$p$ and the NMOS transistors formed in the active-region structures 82$n$-84$n$ are nano-sheet transistors. In some embodiments, when the active-region structures 82$p$-84$p$ and 82$n$-84$n$ are formed with nano-wire structures, the PMOS transistors formed in the active-region structures 82$p$-84$p$ and the NMOS transistors formed in the active-region structures 82$n$-84$n$ are nano-wire transistors.

In the circuit cell 100 as specified by the layout diagram of FIG. 1C, some of the terminal-conductors intersect the active-region structure 82$p$ or 84$p$ at the source/drain regions of PMOS transistors and form the source/drain terminals for the corresponding PMOS transistors, while some of the terminal-conductors intersect the active-region structure 82$n$ or 84$n$ at the source/drain regions of NMOS transistors and form the source/drain terminals for the corresponding NMOS transistors.

In the circuit cell 100, the power rails (20A, 40A, and 20B) in FIG. 1A and the horizontal conducting lines (122A1-122A2, 124A1-122A3, 126A, 122B1-122B2, 124B, and 126B1-126B2) in FIG. 1B are in a metal layer M0 which overlies the interlayer dielectric that covers the gate-conductors and the terminal-conductors. The vertical conducting lines (1$m$1-1$m$2, 1$m$3A-1$m$3B, 1$m$4-1$m$9, 1$m$10A-1$m$10B, and 1$m$11) are in a metal layer M1 which overlies the interlayer dielectric that covers the power rails and the horizontal conducting lines. The power grid stubs (1ST3A-1ST3C and 1ST10A-1ST10C) are also in the metal layer M1. Each of the power grid stubs 1ST3A and 1ST10A is conductively connected to the power rail 20A, each of the power grid stubs 1ST3B and 1ST10B is conductively connected to the power rail 40A, and each of the power grid stubs 1ST3C and 1ST10C is conductively connected to the power rail 20B. The power rail 20A and the power rail 20B are configured to provide a first power supply voltage VDD to the circuit cell 100, while the power rail 40A is configured to provide a second power supply voltage VSS to the circuit cell 100.

Figure 2A:
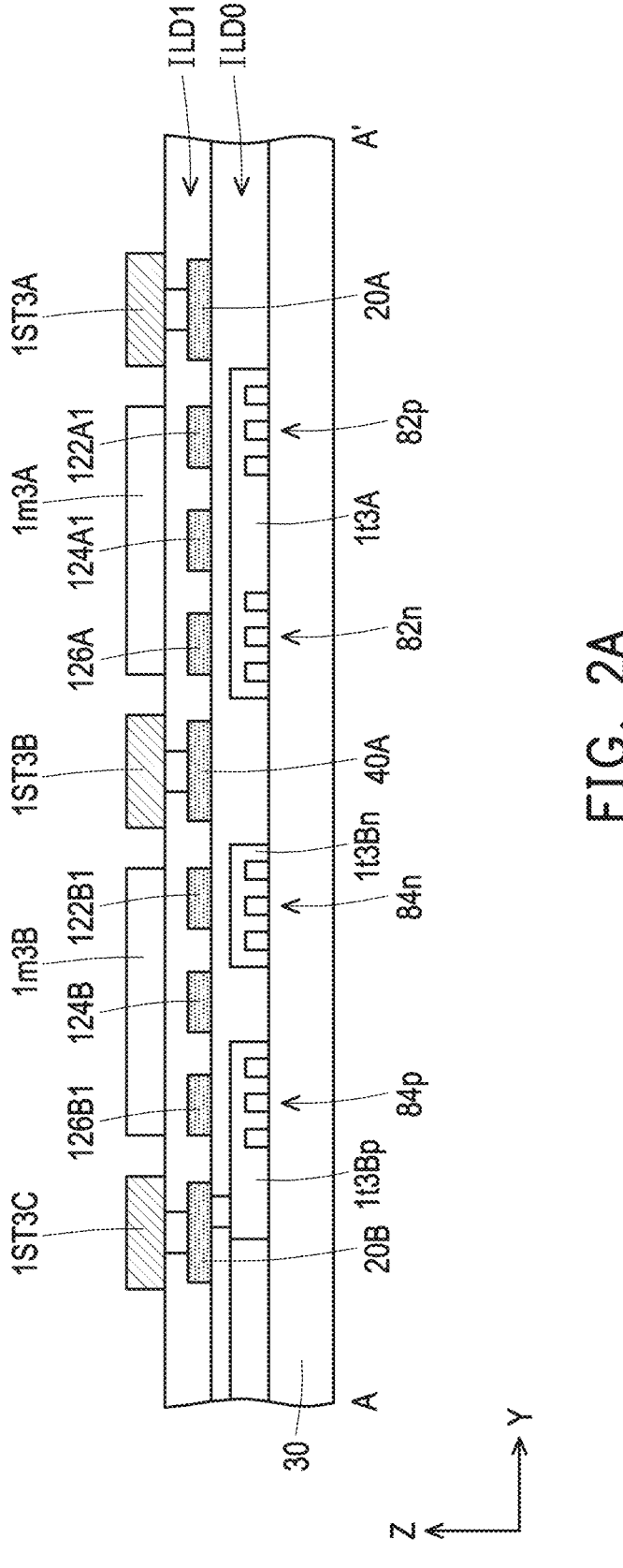
FIGS. 2A-2C are cross-sectional views of the circuit cell in FIGS. 1A-1C, in accordance with some embodiments.

FIG. 2A is a cross-sectional view of the circuit cell 100 in cutting plane A-A' as specified in FIGS. 1A-1C, in accordance with some embodiments. In the cross-sectional view of FIG. 2A, the active-region structures 82$p$, 82$n$, 84$n$, and 84$p$ are on the substrate 30. The terminal-conductor 1$t$3A intersects the active-region structure 82$p$ at the source/drain region of PMOS transistors and intersects the active-region structure 82$n$ at the source/drain region of NMOS transistors, the terminal-conductor 1$t$3Bn intersects the active-region structure 84$n$ at the source/drain region of NMOS transistors, and the terminal-conductor 1$t$3Bp intersects the active-region structure 84$p$ at the source/drain region of PMOS transistors. The horizontal conducting lines 122A1, 124A1, 126A, 122B1, 124B, and 126B1 are in the metal layer (e.g., M0) overlying the interlayer dielectric ILD0 that covers the terminal-conductors 1$t$3A, 1$t$3Bp, and 1$t$3Bn. The power rails 20A, 40A, and 20B are also in the metal layer (e.g., M0) overlying the interlayer dielectric ILD0. The terminal-conductor 1$t$3Bp is conductively connected to the power rail 20B through a via-connector passing through the interlayer dielectric ILD0.

In the cross-sectional view of FIG. 2A, the vertical conducting lines 1$m$3A and 1$m$3B are in the metal layer (e.g., M1) overlying the interlayer dielectric ILD1 that covers the power rails (20A, 40A, and 20B) and the horizontal conducting lines (122A1, 124A1, 126A, 122B1, 124B, and 126B1). The power grid stubs 1ST3A, 1ST3B, and 1ST3C are also in the metal layer (e.g., M1) overlying the interlayer dielectric ILD1. The power grid stubs 1ST3A, 1ST3B, and 1ST3C are correspondingly connected to the power rails 20A, 40A, and 20B though a via-connector passing through the interlayer dielectric ILD1.

Figures 2B, 2C:
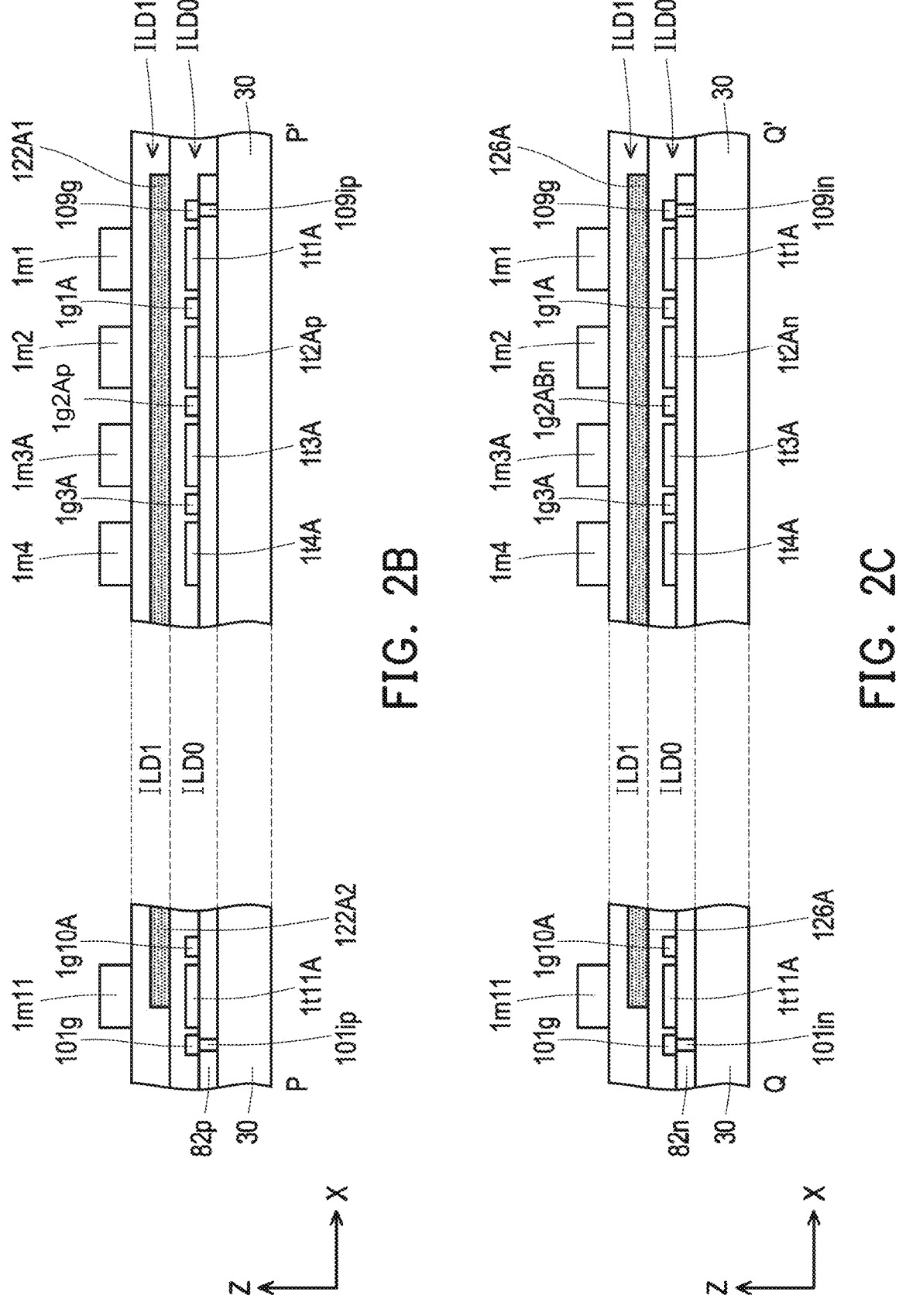

FIG. 2B is a cross-sectional view of the circuit cell 100 in cutting plane P-P' as specified in FIGS. 1A-1C, in accordance with some embodiments. In the cross-sectional view of FIG. 2B, the active-region structure 82$p$ is on the substrate 30. Each of the gate-conductors 1$g$1A, 1$g$2Ap, 1$g$3A, and 1$g$10A intersects the active-region structure 82$p$ at the channel region of a corresponding PMOS transistor. Each of the terminal-conductors 1$t$1A, 1$t$2Ap, 1$t$3A, 1$t$4A, and 1$t$11A intersects the active-region structure 82$p$ at the source/drain of at least one corresponding PMOS transistor. In some embodiments, the active regions (such as, the source region, the channel region, or the drain region) in the active-region structure 82$p$ are isolated from the active regions in the adjacent cells by the boundary isolation region 101$ip$ under the dummy gate-conductor 101$g$ and the boundary isolation region 109$ip$ under the dummy gate-conductor 109$g$.

The horizontal conducting lines 122A1 and 122A2 are in the metal layer (e.g., M0) overlying the interlayer dielectric ILD0 that covers the gate-conductors (1$g$1A, 1$g$2Ap, 1$g$3A, and 1$g$10A) and the terminal-conductors (MA, 1$t$2Ap, 1$t$3A, 1$t$4A, and 1$t$11A). The vertical conducting lines 1$m$1, 1$m$2, 1$m$3A, 1$m$4, and 1$m$11 are in the metal layer (e.g., M1) overlying the interlayer dielectric ILD1 that covers the horizontal conducting lines 122A1 and 122A2.

FIG. 2C is a cross-sectional view of the circuit cell 100 in cutting plane Q-Q' as specified in FIGS. 1A-1C, in accordance with some embodiments. In the cross-sectional view of FIG. 2C, the active-region structure 82$n$ is on the substrate 30. Each of the gate-conductors 1$g$1A, 1$g$2ABn, 1$g$3A, and 1$g$10A intersects the active-region structure 82$n$ at the channel region of a corresponding NMOS transistor. Each of the terminal-conductors 1$t$1A, 1$t$2An, 1$t$3A, 1$t$4A, and 1$t$11A intersects the active-region structure 82$n$ at the source/drain of at least one corresponding NMOS transistor. In some embodiments, the active regions (such as, the source region, the channel region, or the drain region) in the active-region structure 82$n$ are isolated from the active regions in the adjacent cells by the boundary isolation region 101 in under the dummy gate-conductor 101$g$ and the boundary isolation region 109 in under the dummy gate-conductor 109$g$.

The horizontal conducting line 126A is in the metal layer (e.g., M0) overlying the interlayer dielectric ILD0 that covers the gate-conductors (1$g$1A, 1$g$10ABn, 1$g$3A, and 1$g$10A) and the terminal-conductors (1$t$1A, 1$t$2AN, 1$t$3A, 1$t$4A, and lt11A). The vertical conducting lines 1$m$1, 1$m$2, 1$m$3A, 1$m$4, and 1$m$11 are in the metal layer (e.g., M1) overlying the interlayer dielectric ILD1 that covers the horizontal conducting line 126A.

In FIGS. 1A-1C, the vertical cell boundary 101 extending in the Y-direction is aligned with the dummy gate-conductor 101$g$. The vertical cell boundary 101 intersects the boundary isolation region 101$ip$ in the active-region structure 82$p$, because the boundary isolation region 101$ip$ is underneath the dummy gate-conductor 101$g$ as shown in FIG. 2B. The vertical cell boundary 101 also intersects the boundary isolation region 101in in the active-region structure 82$n$, because the boundary isolation region 101in is underneath the dummy gate-conductor 101$g$ as shown in FIG. 2C. The boundary isolation region 101$ip$ in the p-type active-region structure and the boundary isolation region 101in in the n-type active-region structure delineates a vertical cell boundary 101 that intersects each of the boundary isolation region 101$ip$ and the boundary isolation region 101in and extends along the Y-direction. Furthermore, the vertical cell boundary 109 extending in the Y-direction is aligned with the dummy gate-conductor 109$g$. The vertical cell boundary 109 intersects the boundary isolation region 109$ip$ in the active-region structure 82$p$, because the boundary isolation region 109$ip$ is underneath the dummy gate-conductor 109$g$ as shown in FIG. 2B. The vertical cell boundary 109 also intersects the boundary isolation region 109in in the active-region structure 82$n$, because the boundary isolation region 109in is underneath the dummy gate-conductor 109$g$ as shown in FIG. 2C. The boundary isolation region 109$ip$ in the p-type active-region structure and the boundary isolation region 109in in the n-type active-region structure delineates a vertical cell boundary 109 that intersects each of the boundary isolation region 109$ip$ and the boundary isolation region 109in and extends along the Y-direction.

In the circuit cell 100, the vertical conducting lines 1$m$1-1$m$2, 1$m$4-1$m$9, and 1$m$11 are correspondingly aligned with vertical routing tracks TR1-TR2, TR4-TR9, and TR11. The power grid stubs 1ST3A-1ST3C and the vertical conducting lines 1$m$3A-1$m$3B are aligned with vertical routing track TR3. The power grid stubs 1ST10A-1ST10C and the vertical conducting lines 1$m$10A-1$m$10B are aligned with vertical routing track TR10.

While the circuit cell 100 in FIGS. 1A-1C is implemented with power grid stubs 1ST3A-1ST3C in the vertical routing track TR3 and implemented with power grid stubs 1ST10A-1ST10C in the vertical routing track TR10, some other modifications of the circuit cell 100 are implemented with a power grid strip (instead of power grid stubs) in the vertical routing track TR3 and implemented with power grid stubs in the vertical routing track TR10.

Figure 3A:
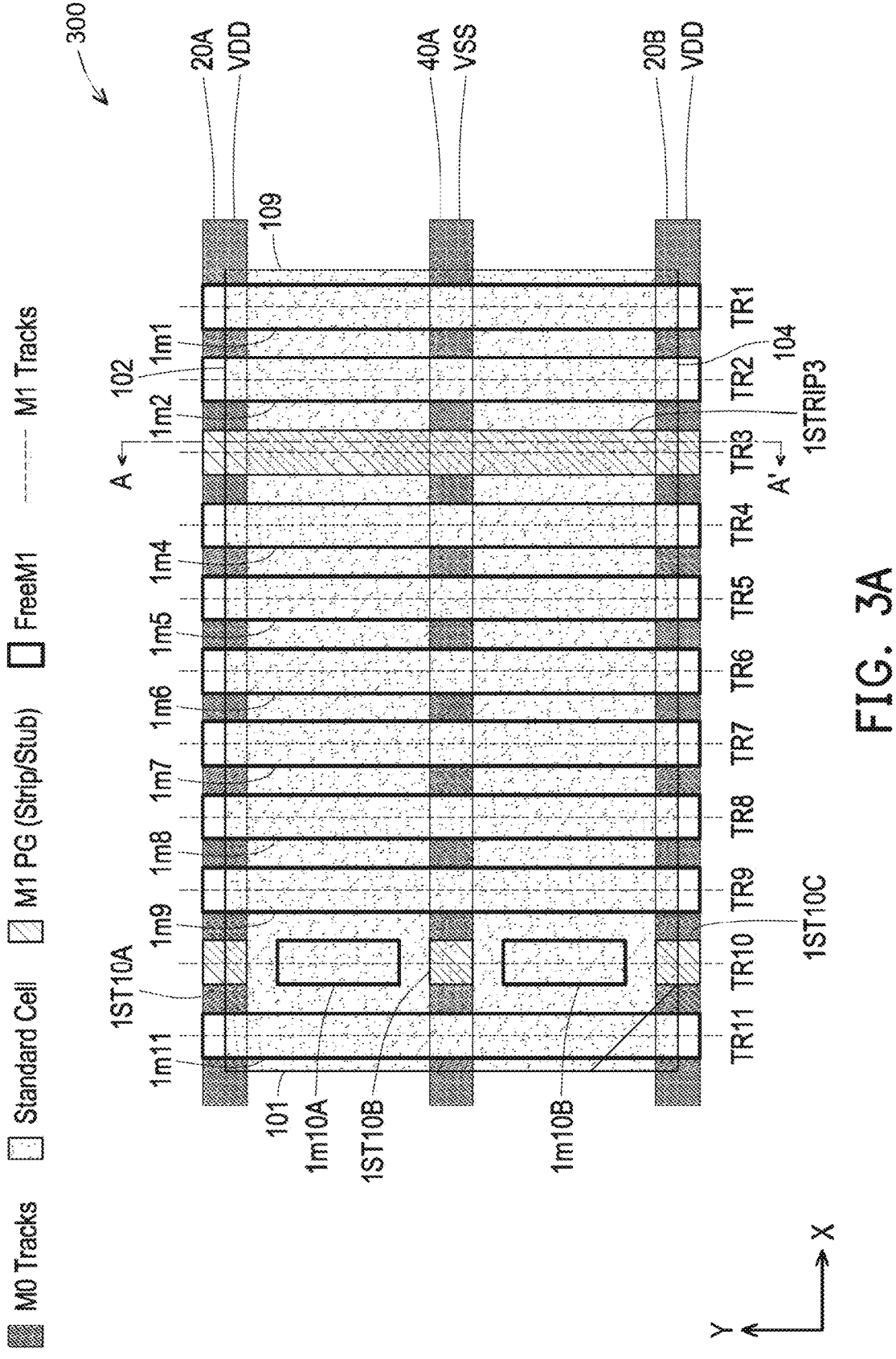
FIG. 3A is a layout diagrams of a circuit cell, in accordance with some embodiments.
Figure 3B:
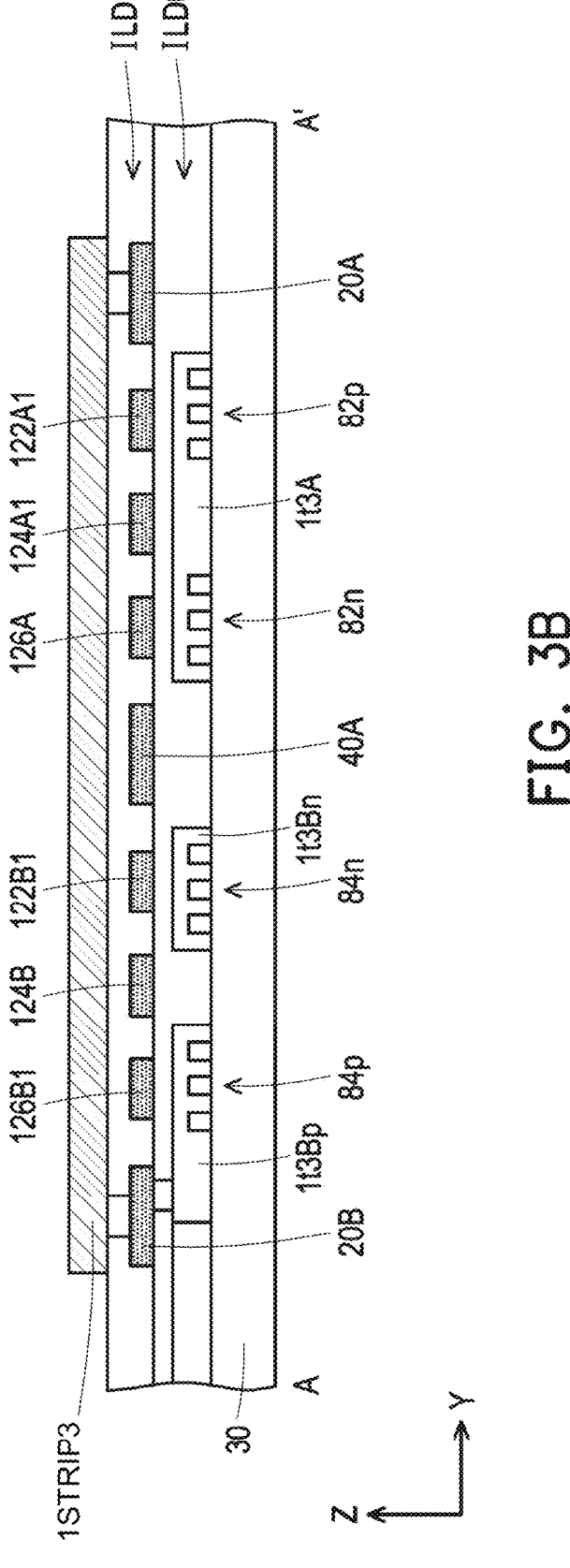
FIG. 3B is a cross-sectional view of the circuit cell in FIG. 3A, in accordance with some embodiments.

FIG. 3A is a layout diagram of a circuit cell 300 having a power grid strip in addition to power grid stubs, in accordance with some embodiments. The circuit cell 300 in FIG. 3A is modified from the circuit cell 100 in FIGS. 1A-1C. The modification includes substituting the power grid stubs 1ST3A-1ST3C and the vertical conducting lines 1$m$3A-1$m$3B in the circuit cell 100 of FIG. 1A with a power grid strip 1STRIP3 for the circuit cell 300 of FIG. 1A. FIG. 3B is a cross-sectional view of the circuit cell 300 in cutting plane A-A' as specified in FIG. 3A, in accordance with some embodiments. In the cross-sectional view of FIG. 3B, the power grid strip 1STRIP3 is in the metal layer (e.g., M1) overlying the interlayer dielectric ILD1 that covers the power rails (20A, 40A, and 20B) and the horizontal conducting lines (122A1, 124A1, 126A, 122B1, 124B, and 126B1). The power grid strip 1STRIP3 is conductively connected to each of the power rails 20A and 20B through a corresponding via-connector passing through the interlayer dielectric ILD1.

Figure 4A:
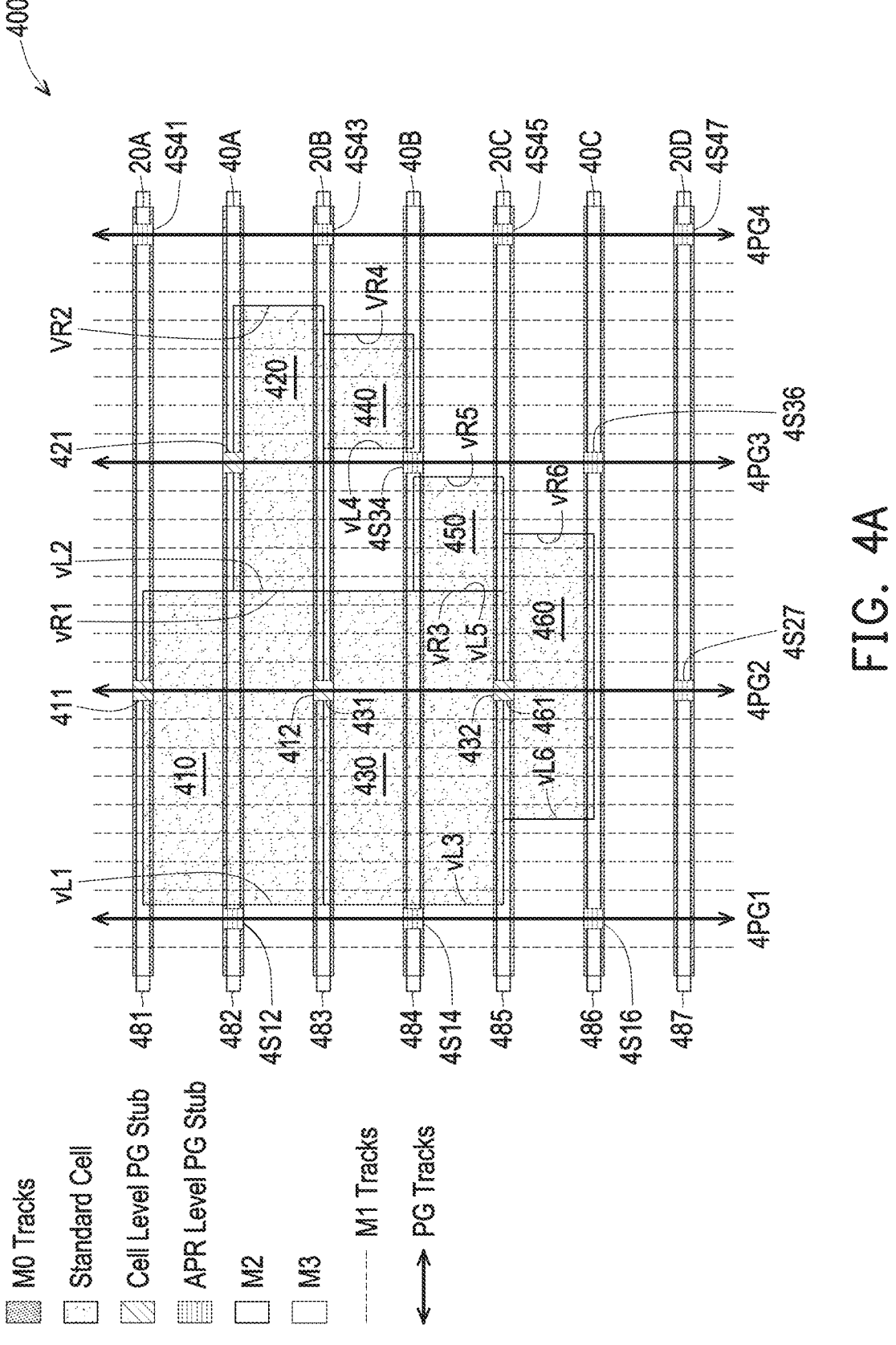
FIG. 4A is a layout diagram of an integrated circuit, in accordance with some embodiments.

In some embodiments, at least one power grid stub in a circuit cell is conductively connected to a horizontal power grid line in a metal layer overlying the interlayer dielectric that covers the power grid stubs. FIG. 4A is a layout diagram of an integrated circuit 400 having horizontal power grid lines connected to power grid stubs in circuit cells, in accordance with some embodiments. In FIG. 4A, the integrated circuit 400 includes a first set of power rails 20A, 20B, 20C, and 20D and a second set of power rails 40A, 40B, and 40C. The power rails 20A, 20B, 20C, and 20D are configured to provide the first power supply voltage VDD to the circuit cells, and the power rails 40A, 40B, and 40C are configured to provide the second power supply voltage VSS to the circuit cells. In some embodiments, the power rails 20A-20D and the power rails 40A-40C are in a metal layer (e.g., M0) overlying the interlayer dielectric that covers the transistors in the integrated circuit.

When the circuit cell 100 in FIG. 1A is implemented with the power grid stubs 1ST3A-1ST3C in vertical routing track TR3 and the power grid stubs 1ST10A-1ST10C in vertical routing track TR10, the vertical conducting lines 1$m$3A-1$m$3B in vertical routing track TR3 and the vertical conducting lines 1$m$10A-1$m$10B in vertical routing track TR10 are all available for intra-cell routing for the circuit cell 100. When the circuit cell 300 in FIG. 3A is implemented with the power grid strip 1STRIP3 in vertical routing track TR3 and the power grid stubs 1ST10A-1ST10C in vertical routing track TR10, the vertical conducting lines 1$m$10A-1$m$10B in vertical routing track TR10 are still available for intra-cell routing for the circuit cell 100, while no vertical conducting line is available in vertical routing track TR3 for intra-cell routing for the circuit cell 100.

As a comparison, if an alternative circuit cell is modified further from the circuit cell 300 and the alternative circuit cell is implemented with the power grid strip 1STRIP3 in vertical routing track TR3 and another power grid strip in vertical routing track TR10, then, no vertical conducting line is available for intra-cell routing in vertical routing track TR3 and vertical routing track TR10. Therefore, when the power grid strip in a given circuit cell is substituted with one or more power grid stubs in the same vertical routing track, the number of vertical conducting lines available for intra-cell routing increases, which may result in more circuit layout flexibility or may result in smaller cell width (or size) of the given circuit cell.

The connections between the power grid stubs and the power grid lines in some integrated circuits are described in the following, with reference to FIGS. 4A-4C, FIGS. 5A-5C, and FIG. 6.

In FIG. 4A, the integrated circuit 400 includes circuit cells 410, 420, 430, 440, 450, and 460. The circuit cell 410 is vertically bounded between the power rails 20A and 20B, and horizontally bounded between the vertical cell boundaries vL1 and vR1. The circuit cell 420 is vertically bounded between the power rails 40A and 20B, and horizontally bounded between the vertical cell boundaries vL2 and vR2. The circuit cell 430 is vertically bounded between the power rails 20B and 20C, and horizontally bounded between the vertical cell boundaries vL3 and vR3. The circuit cell 440 is vertically bounded between the power rails 20B and 40B, and horizontally bounded between the vertical cell boundaries vL4 and vR4. The circuit cell 450 is vertically bounded between the power rails 40B and 20C, and horizontally bounded between the vertical cell boundaries vL5 and vR5. The circuit cell 460 is vertically bounded between the power rails 20C and 40C, and horizontally bounded between the vertical cell boundaries vL6 and vR6.

Some of the circuit cells in the integrated circuit 400 have power grid stubs. For example, each of the circuit cells 410, 420, 430, and 460 has at least one power grid stub. The circuit cell 410 has power grid stubs 411 and 412. The circuit cell 420 has a power grid stub 421. The circuit cell 430 has power grid stubs 431 and 432. The circuit cell 460 has a power grid stub 461. Each of the power grid stubs is in a metal layer (e.g., M1) overlying the interlayer dielectric that covers power rails 20A-20D and 40A-40C. The power grid stubs 411 is connected to the power rail 20A. The power grid stubs 421 is connected to the power rail 40A. The power grid stubs 412 and 431 are connected to the power rail 20B. The power grid stubs 432 and 461 are connected to the power rail 20C.

In FIG. 4A, the integrated circuit 400 includes horizontal power grid lines 481-487. Each of the horizontal power grid lines 481-487 is in a metal layer (e.g., M2) overlying the interlayer dielectric that covers the power grid stubs. The horizontal power grid lines 481, 482, 483, 484, 485, 486, and 487 are correspondingly aligned with the power rails 20A, 40A, 20B, 40B, 20C, 40C, and 20D. Each of the power grid stubs in the circuit cells 410, 420, 430, and 460 is connected to one of the horizontal power grid lines through a via-connector passing though the interlayer dielectric that covers the power grid stubs. Specifically, the power grid stubs 411 and 412 of the circuit cell 410 are correspondingly connected to the horizontal power grid line 481 and 483 through a via-connector. The power grid stub 421 of the circuit cell 420 is connected to the horizontal power grid line 482 through a via-connector. The power grid stubs 431 and 432 of the circuit cell 430 are correspondingly connected to the horizontal power grid lines 483 and 485 through a via-connector. The power grid stub 461 of the circuit cell 460 is connected to the horizontal power grid line 485 through a via-connector.

In FIG. 4A, the integrated circuit 400 also includes Automatic Place and Route level ("APR-level") power grid stubs in the same metal layer as the power grid stubs in the circuit cells. Each of the APR-level power grid stubs in FIG. 4A is aligned with one of the vertical power grid tracks 4PG1, 4PG2, 4PG3, and 4PG4. Each of the power grid stubs in the circuit cells is also aligned with one of the vertical power grid tracks 4PG1, 4PG2, 4PG3, and 4PG4. For example, the APR-level power grid stubs 4S12, 4S14, and 4S16 are aligned with the vertical power grid track 4PG1. The cell level power grid stubs 411, 412/431, and 432/461 and the APR-level power grid stub 4S27 are aligned with the vertical power grid track 4PG2. The cell level power grid stub 421 and the APR-level power grid stubs 4S34 and 4S36 are aligned with the vertical power grid track 4PG3. The APR-level power grid stubs 4S41, 4S43, 4S45, and 4S47 are aligned with the vertical power grid track 4PG4.

In FIG. 4A, each of the APR-level power grid stubs is connected to a corresponding power rail and a corresponding horizontal power grid line 483 through via-connectors. For example, the APR-level power grid stub 4S12 is connected to the power rail 40A though a via-connector passing through the interlayer dielectric that covers power rails, and the APR-level power grid stub 4S12 is also connected to the horizontal power grid line 482 though a via-connector passing through the interlayer dielectric that covers the power grid stubs. Consequently, the APR-level power grid stub 4S12 provides a conductive path between the horizontal power grid line 482 and the power rail 40A. Similarly, the APR-level power grid stub 4S41 provides a conductive path between the horizontal power grid line 481 and the power rail 20A. The APR-level power grid stub 4S43 provides a conductive path between the horizontal power grid line 483 and the power rail 20B. Each of the APR-level power grid stubs 4S14 and 4S34 provides a conductive path between the horizontal power grid line 484 and the power rail 40B. The APR-level power grid stub 4S45 provides a conductive path between the horizontal power grid line 485 and the power rail 20C. Each of the APR-level power grid stubs 4S16 and 4S36 provides a conductive path between the horizontal power grid line 486 and the power rail 40C. Each of the APR-level power grid stubs 4S27 and 4S47 provides a conductive path between the horizontal power grid line 487 and the power rail 20D.

Figure 4B:
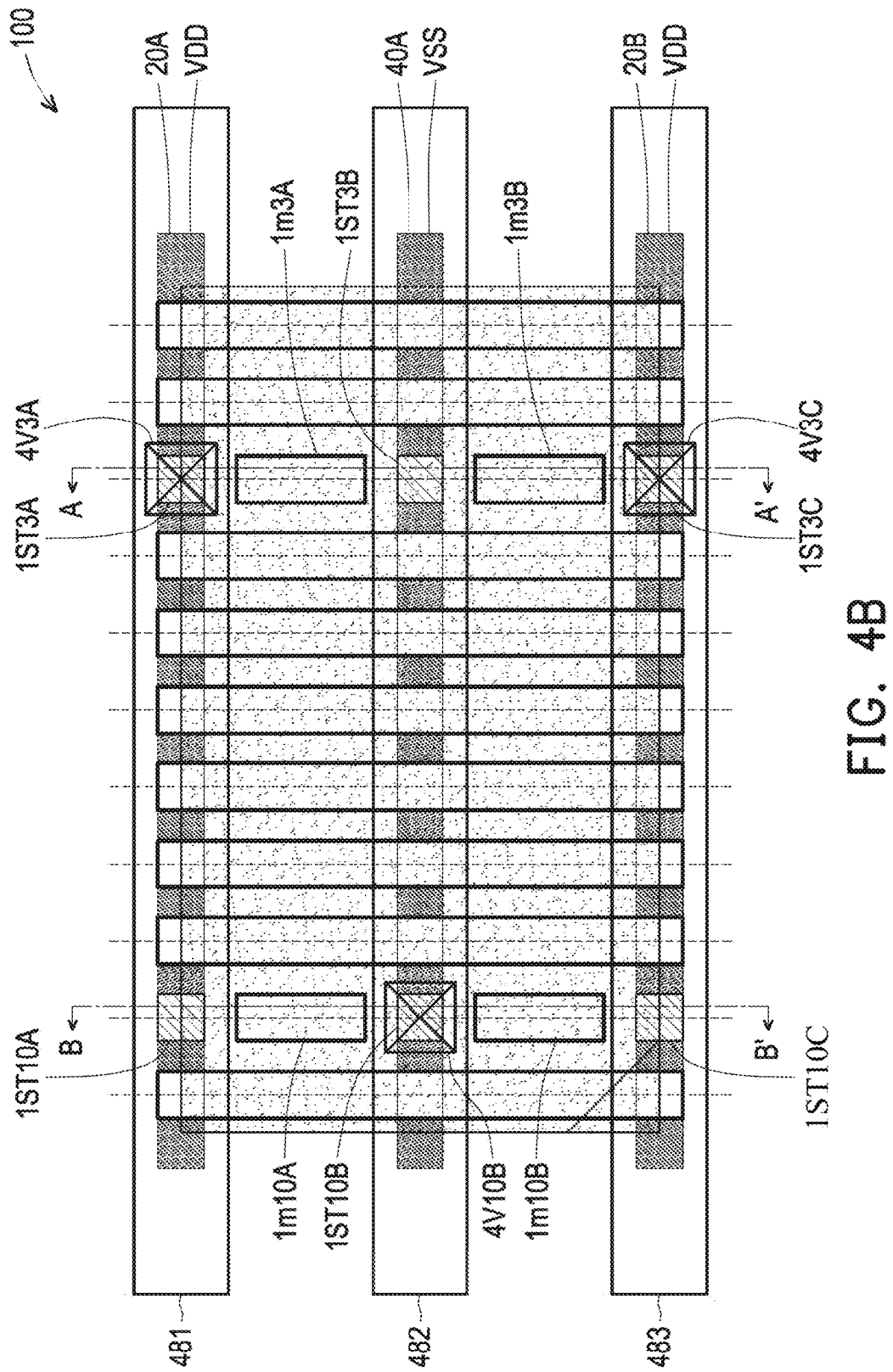
FIG. 4B is a layout diagram of an integrated circuit having horizontal power grid lines, in accordance with some embodiments.
Figure 4C:
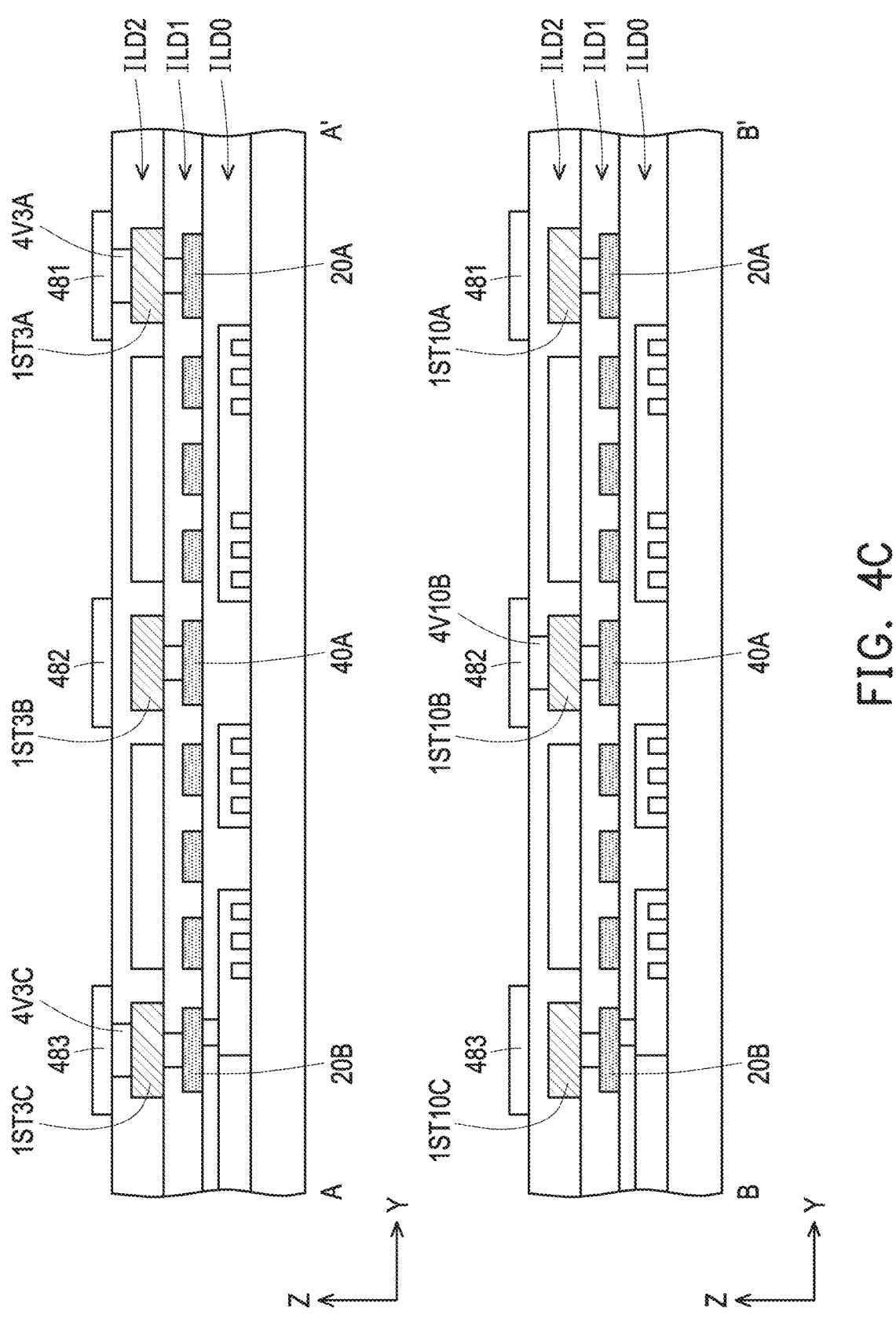
FIG. 4C are cross-sectional views of the integrated circuit in FIG. 4B in accordance with some embodiments.

The conductive connection formed between a horizontal power grid line and a power grid stub of a circuit cell is depicted in FIG. 4B and FIG. 4C, in which the circuit cell 100 in FIGS. 1A-1C is used as an example circuit cell. FIG. 4B is a layout diagram of an integrated circuit having horizontal power grid lines connected to power grid stubs in a circuit cell, in accordance with some embodiments. The layout diagram of FIG. 4B is modified from the layout diagram of FIG. 1A. In FIG. 4B, the modification includes adding the layout patterns for specifying the horizontal power grid lines 481, 482, and 483. The horizontal power grid lines in a metal layer (e.g., M2) overly the interlayer dielectric that covers the power grid stubs (e.g., 1ST3A-1ST3C and 1ST10A-1ST10C). The modification also includes adding the layout patterns for specifying the via-connectors 4V3A, 4V3C, and 4V10B. The via-connector 4V3A conductively connects the horizontal power grid line 481 with the power grid stub 1ST3A (which is conductively connected to the power rail 20A). The via-connector 4V10B conductively connects the horizontal power grid line 482 with the power grid stub 1ST10B (which is conductively connected to the power rail 40A). The via-connector 4V3C conductively connects the horizontal power grid line 483 with the power grid stub 1ST3C (which is conductively connected to the power rail 20B).

FIG. 4C is cross-sectional views of the integrated circuit in cutting planes A-A' and B-B' as specified in FIG. 4B in accordance with some embodiments. The cross-sectional view in cutting planes A-A' in FIG. 4C is a modification of the cross-sectional view in cutting planes A-A' in FIG. 2A. In the cross-sectional views in cutting planes A-A' and B-B', the horizontal power grid lines 481, 482, and 483 are in a metal layer (e.g., M2) overlying the interlayer dielectric that covers the power grid stubs 1ST3A, 1ST3B, and 1ST3C. In the cross-sectional views in cutting planes A-A', the horizontal power grid line 481 is conductively connected to the power grid stub 1ST3A through the via-connector 4V3A, and the horizontal power grid line 483 is conductively connected to the power grid stub 1ST3C through the via-connector 4V3C. In the cross-sectional views in cutting planes B-B', the horizontal power grid line 482 is conductively connected to the power grid stub 1ST10B through the via-connector 4V10B.

In the embodiments as shown in FIG. 4B, each of the power rails 20A, 40A, and 20B is connected to a corresponding horizontal power grid line (such as, 481, 482, and 483) through the power grid stubs in the circuit cell 100. In some alternative embodiments, only two of the power rails 20A, 40A, and 20B are connected to horizontal power grid lines through the power grid stubs in the circuit cell 100. For example, in some alternative embodiments, the power grid stubs 1ST3A and 1ST3C are correspondingly connected to the horizontal power grid lines 481 and 483, while the power grid stub 1ST10B is not connected to the horizontal power grid line 482. Consequently, two power grid stubs in the circuit cell 100 are used to connect correspondingly the power rails 20A and 20B to the horizontal power grid lines 481 and 483. In some other alternative embodiments, only one of the power rails 20A, 40A, and 20B is connected to a horizontal power grid line through a power grid stub in the circuit cell 100. For example, in some alternative embodiments, the power grid stub 1ST10B is connected to the horizontal power grid line 482, while each of the power grid stubs 1ST3A and 1ST3C is not connected to the horizontal power grid lines 481 or 483. Consequently, one power grid stub in the circuit cell 100 is used to connect the power rail 40A to horizontal power grid line 482.

Figure 5A:
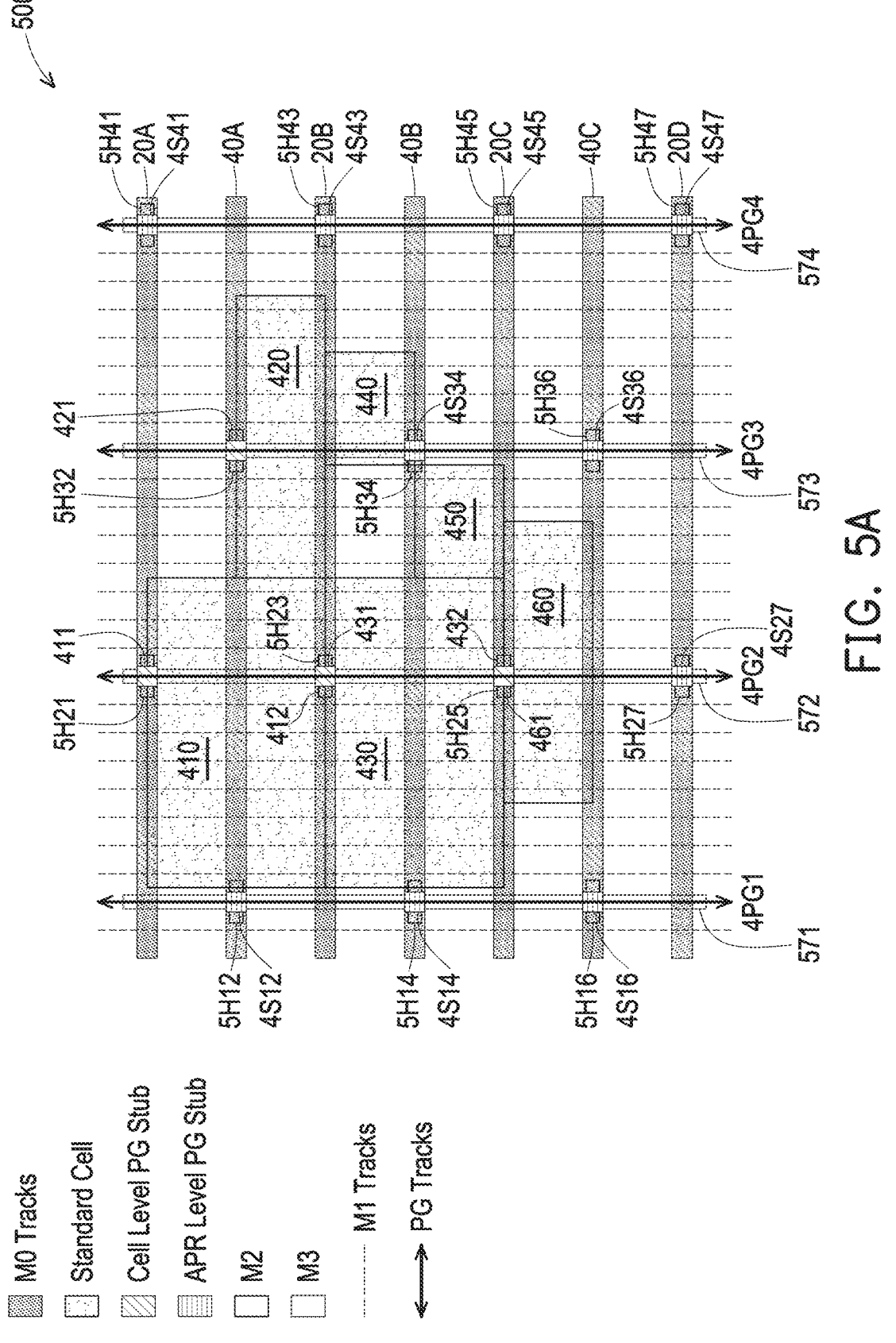
FIG. 5A is a layout diagrams of an integrated circuit having vertical power grid lines and power stub extensions, in accordance with some embodiments.

In some embodiments, at least one power grid stub in a circuit cell is conductively connected to a vertical power grid line through a power stub extension in a metal layer (e.g., M2) overlying the interlayer dielectric that covers the power grid stubs in the circuit cell. The vertical power grid line is in another metal layer (e.g., M3) overlying the interlayer dielectric that covers the power stub extension. FIG. 5A is a layout diagrams of an integrated circuit 500 having vertical power grid lines connected to power grid stubs in circuit cells through power stub extensions, in accordance with some embodiments. Similar to the integrated circuit 400 in FIG. 4A, the integrated circuit 500 in FIG. 5A also includes the power rails 20A-20D, the second set of power rails 40A-40C, and the circuit cells 410-460.

While the power grid stubs in the circuit cells 410, 420, 430, and 460 of FIG. 4A are conductively connected to horizontal power grid lines 481-487, the power grid stubs in the circuit cells 410, 420, 430, and 460 of FIG. 5A are conductively connected to vertical power grid lines 571-574 through various power stub extensions. In FIG. 5A, the integrated circuit 500 includes vertical power grid lines 571, 572, 573, and 574 correspondingly aligned with the vertical power grid tracks 4PG1, 4PG2, 4PG3, and 4PG4. The integrated circuit 500 also includes power stub extensions 5H12, 5H14, and 5H16 aligned with the vertical power grid track 4PG1, power stub extensions 5H21, 5H23, 5H25, and 5H27 aligned with the vertical power grid track 4PG2, power stub extensions 5H32, 5H34, and 5H36 aligned with the vertical power grid track 4PG3, and power stub extensions 5H41, 5H43, 5H45, and 5H47 aligned with the vertical power grid track 4PG4. The power stub extensions are in a metal layer (e.g., M2) overlying the interlayer dielectric that covers the power grid stubs in the circuit cell. The vertical power grid lines 571-574 are in a metal layer (e.g., M3) overlying the interlayer dielectric that covers power stub extensions.

The vertical power grid line 571 is conductively connected to each of the power stub extensions 5H12, 5H14, and 5H16 through a corresponding via-connector (which is not explicitly shown in FIG. 5A, for the reason of maintaining simplicity). The power stub extensions 5H12, 5H14, and 5H16 are correspondingly connected to the APR-level power grid stubs 4S12, 4S14, and 4S16. Each of the APR-level power grid stubs 4S12, 4S14, and 4S16 is correspondingly connected to one of the power rails 40A, 40B, and 40C. The vertical power grid line 571 is configured to apply a supply voltage (such as the voltage VSS) to each of the power rails 40A, 40B, and 40C.

The vertical power grid line 572 is conductively connected to each of the power stub extensions 5H21, 5H23, 5H25, and 5H27 through a corresponding via-connector (which is not shown in FIG. 5A). The power stub extensions 5H21, 5H23, and 5H25 are correspondingly connected to the power grid stubs 411, 431, and 461 in various circuit cells, and the power stub extension 5H27 are connected to the APR-level power grid stub 4S27. Each of the power grid stubs 411, 431, and 461 is correspondingly connected to one of the power rails 20A, 20B, and 20C. The APR-level power grid stub 4S27 is connected to the power rail 20D. The vertical power grid line 572 is configured to apply a supply voltage (such as the voltage VDD) to each of the power rails 20A, 20B, 20C, and 20D.

The vertical power grid line 573 is conductively connected to each of the power stub extensions 5H32, 5H34, and 5H36 through a corresponding via-connector (which is not shown in FIG. 5A). The power stub extension 5H32 is connected to the power grid stub 421 in the circuit cell 420, and the power stub extensions 5H34 and 5H36 are correspondingly connected to the APR-level power grid stubs 4S34 and 4S36. The power grid stub 421 is connected to one of the power rails 40A. Each of the APR-level power grid stubs 4S34 and 4S36 is correspondingly connected to one of the power rails 40B and 40C. The vertical power grid line 573 is configured to apply a supply voltage (such as the voltage VSS) to each of the power rails 40A, 40B, and 40C.

The vertical power grid line 574 is conductively connected to each of the power stub extensions 5H41, 5H43, 5H45, and 5H47 through a corresponding via-connector (which is not shown in FIG. 5A). The power stub extensions 5H41, 5H43, 5H45, and 5H47 are correspondingly connected to the APR-level power grid stubs 4S41, 4S43, 4S45, and 4S47. Each of the APR-level power grid stubs 4S41, 4S43, 4S45, and 4S47 is correspondingly connected to one of the power rails 20A, 20B, 20C, and 20D. The vertical power grid line 574 is configured to apply a supply voltage (such as the voltage VDD) to each of the power rails 20A, 20B, 20C, and 20D.

Figure 5B:
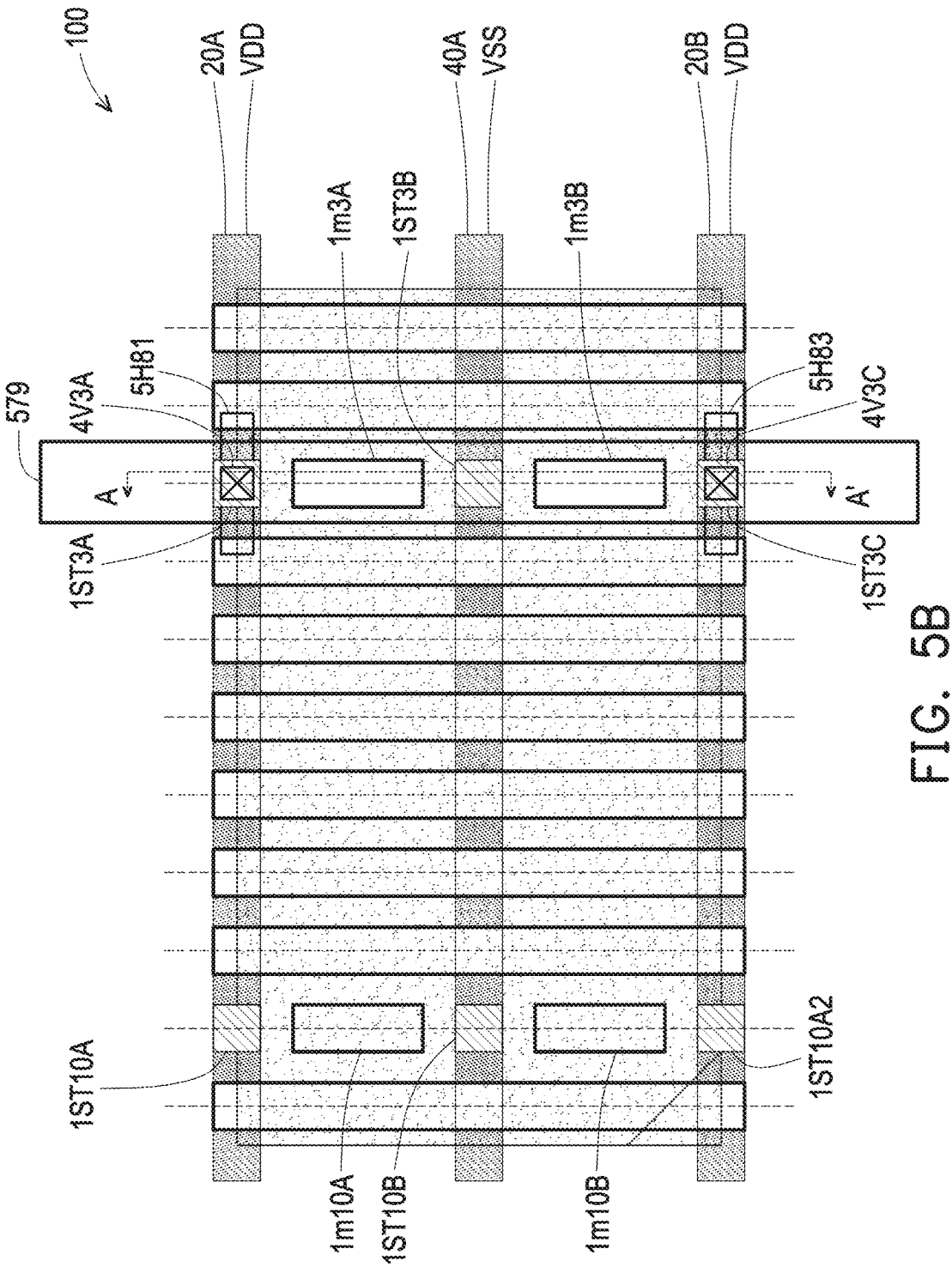
FIG. 5B is a layout diagram of an integrated circuit having a vertical power grid line and power stub extensions, in accordance with some embodiments.
Figure 5C:
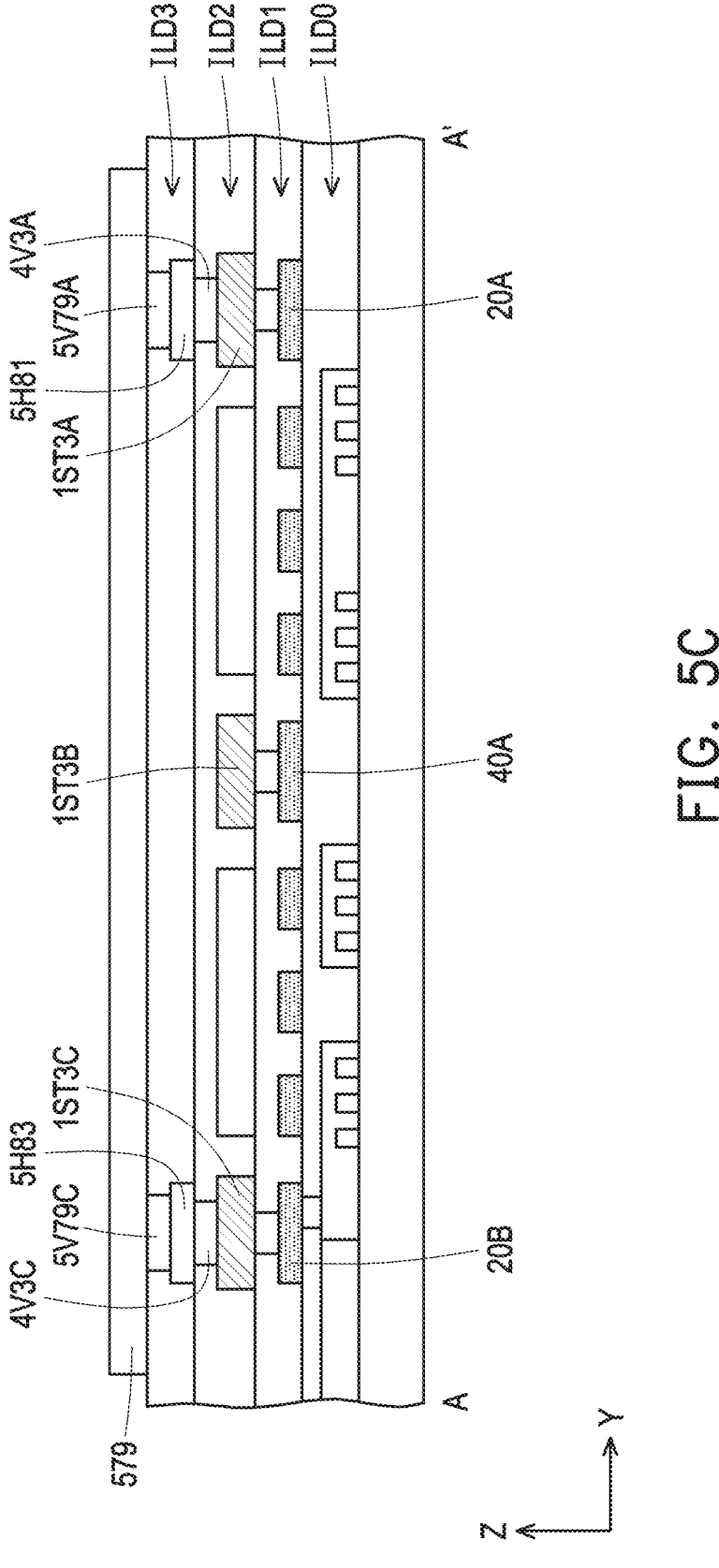
FIG. 5C is a cross-sectional view of the integrated circuit in FIG. 5B in accordance with some embodiments.

The conductive connection formed between a vertical power grid line and a power grid stub of a circuit cell is depicted in FIG. 5B and FIG. 5C, in which the circuit cell 100 in FIGS. 1A-1C is used as an example circuit cell. FIG. 5B is a layout diagram of an integrated circuit having a vertical power grid line connected to power grid stubs in a circuit cell through power stub extensions, in accordance with some embodiments. The integrated circuit in FIG. 5B is modified from the integrated circuit in FIG. 4B. The modification includes substituting the horizontal power grid lines 481 and 483 correspondingly with power stub extensions 5H81 and 5H83, removing the horizontal power grid line 482, and adding a vertical power grid line 579. The vertical power grid line 579 is conductively connected to each of the power grid stubs 1ST3A and 1ST3C correspondingly through one of the power stub extensions 5H81 and 5H83.

FIG. 5C is a cross-sectional view of the integrated circuit in cutting plane A-A' as specified in FIG. 5B in accordance with some embodiments. The cross-sectional view in cutting planes A-A' in FIG. 5C is a modification of the cross-sectional view in cutting planes A-A' in FIG. 4C. In the cross-sectional views in cutting plane A-A', the power stub extensions 5H81 and 5H83 are in a metal layer (e.g., M2) overlying the interlayer dielectric IDL2 that covers the power grid stubs 1ST3A, 1ST3B, and 1ST3C. The vertical power grid line 579 is in in a metal layer (e.g., M3) overlying the interlayer dielectric IDL 3 that covers the power stub extensions 5H81 and 5H83.

In FIG. 5C, a conductive path from the vertical power grid line 579 to the power rail 20A is formed through the power grid stub 1ST3A of the circuit cell 100. Specifically, the vertical power grid line 579 is conductively connected to the power stub extensions 5H81 through a via-connector 5V79A, the power stub extension 5H81 is conductively connected to the power grid stub 1ST3A through the via-connector 4V3A, and the power grid stub 1ST3A is conductively connected to the power rail 20A. Similarly, in FIG. 5C, a conductive path from the vertical power grid line 579 to the power rail 20C is formed through the power grid stub 1ST3C of the circuit cell 100. Specifically, the vertical power grid line 579 is conductively connected to the power stub extension 5H83 through a via-connector 5V79C, the power stub extension 5H83 is conductively connected to the power grid stub 1ST3C through the via-connector 4V3C, and the power grid stub 1ST3C is conductively connected to the power rail 20B.

Figure 6:
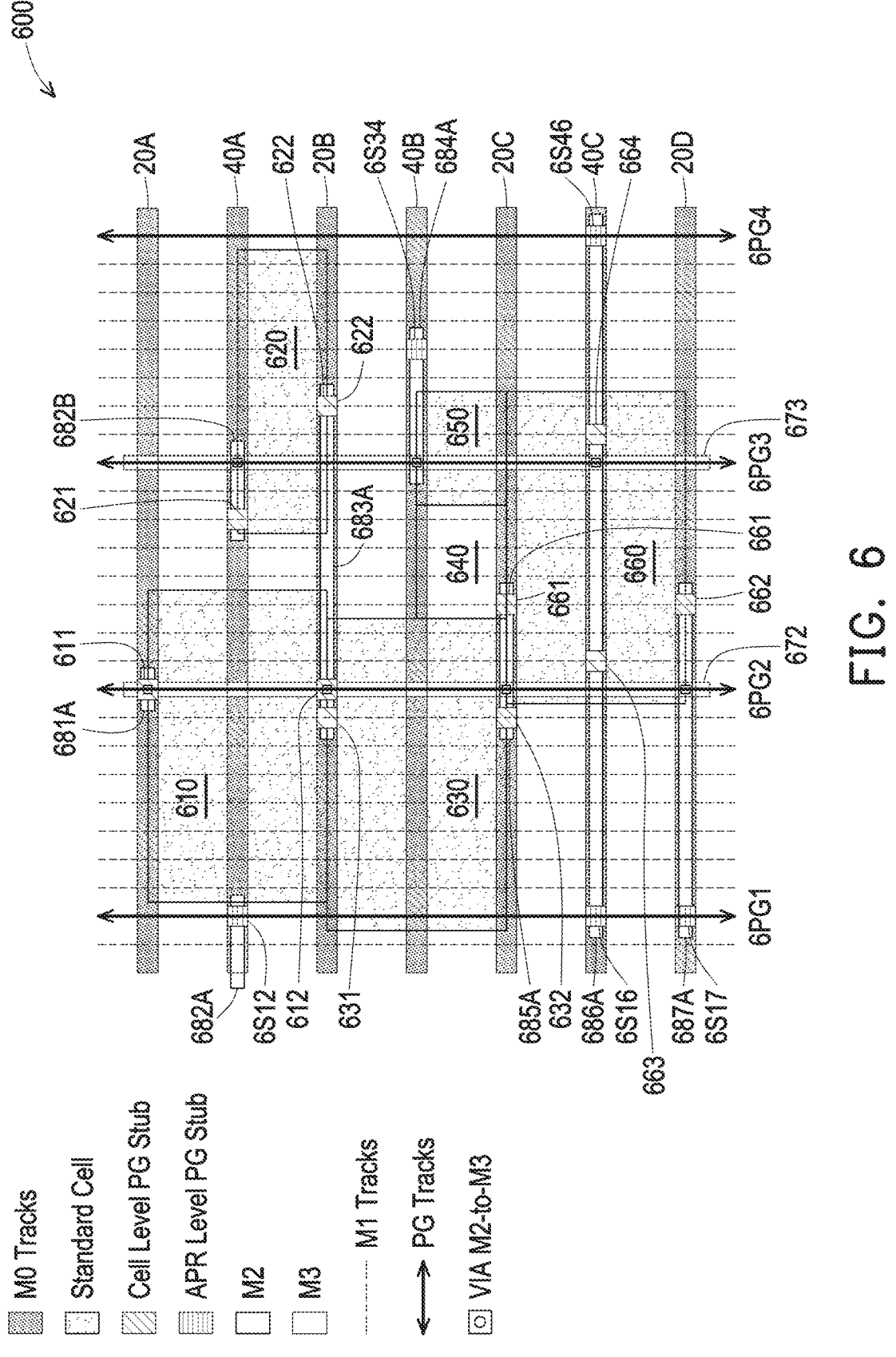
FIG. 6 is a layout diagrams of an integrated circuit having a vertical power grid line and local routing lines, in accordance with some embodiments.

In some embodiments, at least one power grid stub in a circuit cell is conductively connected to a vertical power grid line through a local routing line in a metal layer (e.g., M2) overlying the interlayer dielectric that covers the power grid stubs in the circuit cell. The vertical power grid line is in another metal layer (e.g., M1) overlying the interlayer dielectric that covers the local routing line. FIG. 6 is a layout diagram of an integrated circuit 600 having a vertical power grid line connected to a power grid stub in circuit cells through either a power stub extension or a local routing line, in accordance with some embodiments.

Similar to the integrated circuit 400 in FIG. 4A, the integrated circuit 600 in FIG. 6 also includes the first set of power rails 20A-20D and the second set of power rails 40A-40C. Additionally, the integrated circuit 600 includes the circuit cells 610, 620, 630, 640, 650, and 660. The circuit cell 610 is bounded between the power rails 20A and 20B. The circuit cell 620 is bounded between the power rails 40A and 20B. The circuit cell 630 is bounded between the power rails 20B and 20C. The circuit cells 640 and 650 are bounded between the power rails 40B and 20C. The circuit cell 660 is bounded between the power rails 20C and 20D.

In FIG. 6, each of the circuit cells 610, 620, 630, and 660 has at least one power grid stub. The circuit cell 610 has power grid stubs 611 and 612. The circuit cell 620 has power grid stubs 621 and 622. The circuit cell 630 has power grid stubs 631 and 632. The circuit cell 660 has power grid stubs 661-664. Each of the power grid stubs is in a metal layer (e.g., M1) overlying the interlayer dielectric that covers power rails 20A-20D and 40A-40C. The power grid stub 611 is connected to the power rail 20A. The power grid stub 621 is connected to the power rail 40A. The power grid stubs 631, 612, and 622 are connected to the power rail 20B. The power grid stubs 632 and 661 are connected to the power rail 20C. The power grid stubs 663 and 664 are connected to the power rail 40C. The power grid stub 662 is connected to the power rail 20D.

The integrated circuit 600 also includes APR-level power grid stubs 6S12, 6S16, 6S17, 6S34, and 6S46 in the metal layer (e.g., M1) overlying the interlayer dielectric that covers power rails 20A-20D and 40A-40C. Each of the APR-level power grid stubs 6S12, 6S16, 6S17, 6S34, and 6S46 is correspondingly connected to one of the power rails 40A. 40C, 20D, 40B, and 40C.

The integrated circuit 600 further includes local routing lines 681A, 682A, 682B, 683A, 684A, 685A, 686A, and 687A. Each of the local routing lines is in a metal layer (e.g., M2) overlying the interlayer dielectric that covers the power grid stubs. The integrated circuit 600 still includes vertical power grid lines 672 and 673. Each of the vertical power grid lines 672 and 673 is in a metal layer (e.g., M3) overlying the interlayer dielectric that covers the local routing lines. The integrated circuit 600 has vertical power grid tracks 6PG1, 6PG2, 6PG3 and 6PG4. The vertical power grid lines 672 and 673 are correspondingly aligned with the vertical power grid tracks 6PG2 and 6PG3.

In FIG. 6, the vertical power grid line 672 is configured to apply a supply voltage (such as the voltage VDD) to each of the power rails 20A, 20B, 20C, and 20D. For example, the vertical power grid line 672 is conductively connected to each of the local routing lines 681A, 683A, 685A, and 687A through a corresponding via-connector (which is shown as a via M2-to-M3) that passes through the interlayer dielectric covering the local routing lines. Each of the local routing lines 681A, 683A, 685A, and 687A is correspondingly connected to the power rails 20A, 20B, 20C, and 20D conductively through at least one of the power grid stubs in the metal layer (e.g., M1) overlying the interlayer dielectric that covers the power rails.

The local routing line 681A is conductively connected to the power grid stub 611 of the circuit cell 610, and the power grid stub 611 is conductively connected to the power rail 20A. The local routing line 681A functions as a power stub extension (similar to the power stub extensions of the integrated circuit 500 in FIG. 5A), when both the power grid stub 611 and the via-connector for connecting the local routing line 681A to the power grid stub 611 are aligned with the vertical power grid line 672.

The local routing line 683A is conductively connected to the power grid stub 631 of the circuit cell 630 and the power grid stub 622 of the circuit cell 620, while each of the power grid stubs 631 and 622 is conductively connected to the power rail 20B. The local routing line 685A is conductively connected to the power grid stub 632 of the circuit cell 630 and the power grid stub 661 of the circuit cell 660, while each of the power grid stubs 632 and 661 is conductively connected to the power rail 20C. The local routing line 687A is conductively connected to the power grid stub 662 of the circuit cell 660 and the APR-level power grid stub 6S17, while each of the power grid stubs 662 and 6S17 is conductively connected to the power rail 20D.

In FIG. 6, the vertical power grid line 673 is configured to apply a supply voltage (such as the voltage VSS) to each of the power rails 40A, 40B, and 40C. For example, the vertical power grid line 673 is conductivity connected to each of the local routing lines 682A, 682B, and 686A through a corresponding via-connector (which is shown as a via M2-to-M3) that passes through the interlayer dielectric covering the local routing lines. Each of the local routing lines 682A, 682B, and 686A is correspondingly connected to the power rails 40A, 40B, and 40C conductively through at least one of the power grid stubs in the metal layer (e.g., M1) overlying the interlayer dielectric that covers the power rails.

The local routing line 682B is conductively connected to the power grid stub 621 of the circuit cell 620, while the power grid stub 621 is conductively connected to the power rail 40A. The local routing line 684A is conductively connected to the APR-level power grid stub 6S34 which is conductively connected to the power rail 40B. The local routing line 686A is conductively connected to the power grid stubs 663-664 of the circuit cell 660 and the APR-level power grid stubs 6S16 and 6S46, while each of the power grid stubs 663-664, 6S16 and 6S46 is conductively connected to the power rail 40C.

Figure 7A:
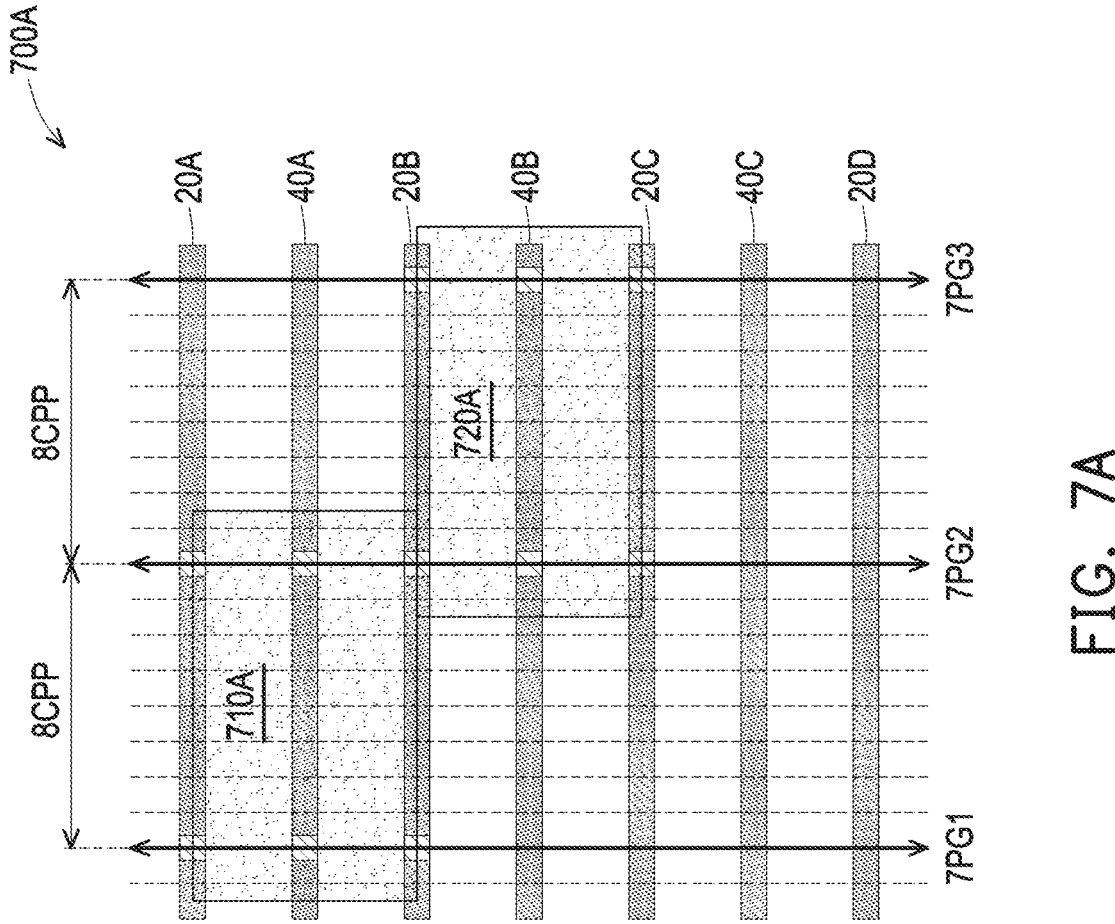

FIGS. 7A-7B are layout diagrams of an integrated circuit having different implementations of the horizontal distance between the power grid stubs in the circuit cells, in accordance with some embodiments. In FIG. 7A, the horizontal distance between the power grid stubs in the circuit cells is the same as the horizontal distance between two vertical power grid tracks. In FIG. 7B, the horizontal distance between the power grid stubs in the circuit cells is smaller than the horizontal distance between two vertical power grid tracks.

In FIG. 7A, the integrated circuit 700A includes the circuit cells 710A and 720A. The circuit cell 710A is between power rails 20A and 20B. The circuit cell 720A is between power rails 20B and 20C. The horizontal distance between two vertical power grid tracks is 8 CPP ("Contacted Poly Pitch"). The horizontal distance between the power grid stubs in the circuit cells is also 8 CPP. The power grid stubs in each circuit cell are vertically aligned with the power grid tracks 7PG1, 7PG2, or 7PG3.

In some embodiments, when the integrated circuit 700A includes horizontal power grids in a metal layer (e.g., M2) overlying the interlayer dielectric that covers the power grid stubs, one or more power grid stubs in the circuit cell 710A or 720A are connected to a horizontal power grid through a via-connector passing through the interlayer dielectric that covers the power grid stubs (with an implementation similar to that in FIG. 4A). In some embodiments, the integrated circuit 700A includes vertical power grids in a metal layer (e.g., M3) overlying the interlayer dielectric that covers power stub extensions which are in a metal layer (e.g., M2) overlying the interlayer dielectric on top of the power grid stubs. One or more power grid stubs in the circuit cell 710A or 720A are connected to a vertical power grid line through a power stub extension (with an implementation similar to that in FIG. 5A).

In FIG. 7B, the integrated circuit 700B includes the circuit cells 710B, 720B, 730B, and 740B. The circuit cell 710B is between power rails 20A and 20B. The circuit cell 720B is between power rails 20B and 20C. The circuit cell 730B is between power rails 20C and 20D. The circuit cell 740B is between power rails 20D and 20E. The horizontal distance between two vertical power grid tracks is 8 CPP. The horizontal distance between the power grid stubs in each of the circuit cells 710B, 720B, 730B, and 740B is 6 CPP. Some power grid stubs in the circuit cells are vertically aligned with the power grid tracks 7PG1, 7PG2, or 7PG3. Some power grid stubs in the circuit cells are not vertically aligned with the power grid tracks 7PG1, 7PG2, or 7PG3.

In some embodiments, when the integrated circuit 700B includes horizontal power grids in a metal layer (e.g., M2) overlying the interlayer dielectric that covers the power grid stubs, one or more power grid stubs in the circuit cell 710B, 720B, 730B, or 740B are connected to a horizontal power grid through a via-connector passing through the interlayer dielectric that covers the power grid stubs (with an implementation similar to that in FIG. 4A). In some embodiments, the integrated circuit 700B includes vertical power grids in a metal layer (e.g., M3) overlying the interlayer dielectric that covers local routing lines which are in a metal layer (e.g., M2) overlying the interlayer dielectric on top of the power grid stubs. One or more power grid stubs in the circuit cell 710A or 720A are connected to a vertical power grid line through one of the local routing lines (with an implementation similar to that in FIG. 6).

Figure 8A:
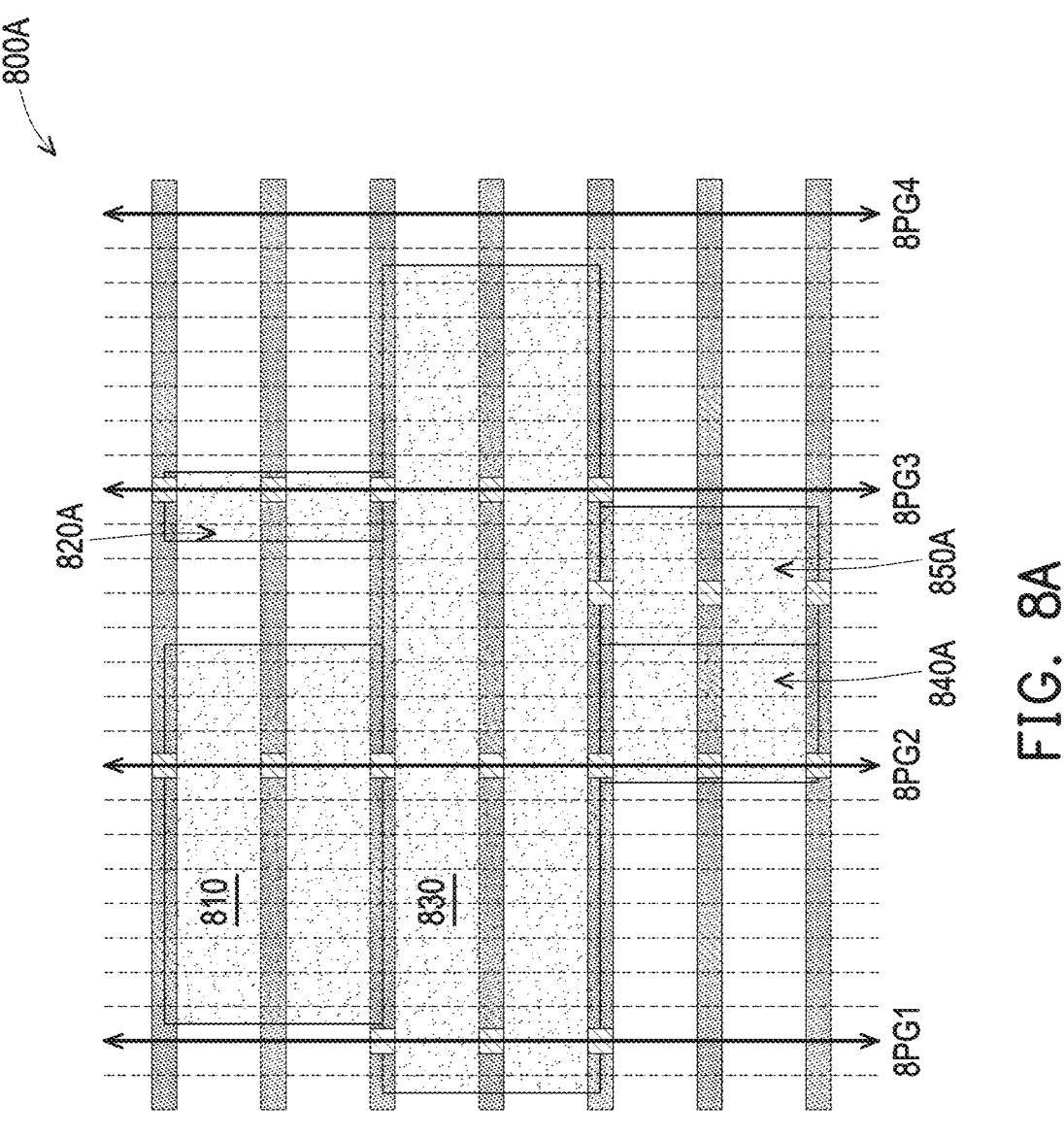
FIGS. 8A-8B are layout diagrams of an integrated circuit having different implementations of power grid stubs, in accordance with some embodiments.
Figure 8B:
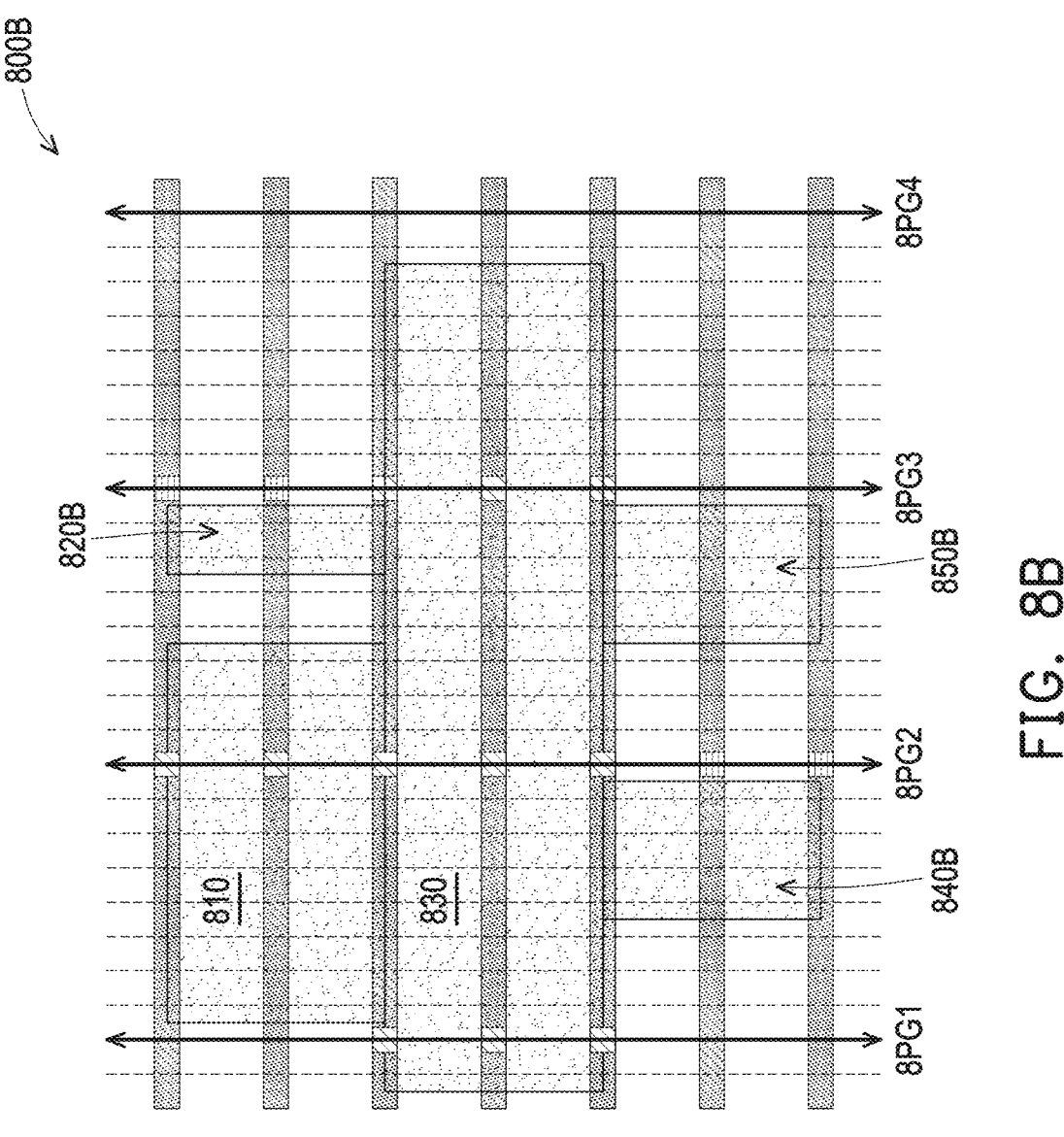

FIGS. 8A-8B are layout diagrams of an integrated circuit having different implementations of power grid stubs in circuit cells, in accordance with some embodiments. In FIG. 8A, each of the circuit cells are implemented with power grid stubs. In FIG. 8B, selected circuit cells are implemented with power grid stubs, and each circuit cell that has a cell width smaller than the horizontal distance between two vertical power grid tracks is not implemented with power grid stubs.

The integrated circuit 800A in FIG. 8A includes the circuit cells 810, 820A, 830, 840A, and 850A. The integrated circuit 800B in FIG. 8B includes the circuit cells 810, 820B, 830, 840B, and 850B. In FIGS. 8A-8B, the power grid stubs in each of the circuit cells are aligned with one of the vertical power grid tracks 8PG1, 8PG2, 8PG3, and 8PG4. Each of the circuit cells 810 and 830 has a cell width larger than the horizontal distance between two vertical power grid tracks. Each of the circuit cells 820A, 840A, and 850A in FIG. 8A has a cell width smaller than the horizontal distance between two vertical power grid tracks. Each of the circuit cells 820B, 840B, and 850B in FIG. 8B also has a cell width smaller than the horizontal distance between two vertical power grid tracks.

The layout design of the integrated circuit 800B in FIG. 8B is modified from the layout design of the integrated circuit 800A in FIG. 8A. Each of the circuit cells 820A, 840A, and 850A in FIG. 8A is replaced correspondingly by one of the circuit cells 820B, 840B, and 850B. Even though the circuit cells 820B, 840B, and 850B in FIG. 8B have the same circuit function as the circuit cells 820A, 840A, and 850A in FIG. 8A, none of the circuit cells 820B, 840B, and 850B in FIG. 8B is implemented with power grid stubs. Each of the circuit cells 820B, 840B, and 850B is positioned between two vertical power grid tracks. In FIG. 8B, the circuit cell 820B is between vertical power grid tracks 8PG2 and 8PG3, the circuit cell 840B is between vertical power grid tracks 8PG1 and 8PG2, and the circuit cell 850B is between vertical power grid tracks 8PG2 and 8PG3.

Figure 9A:
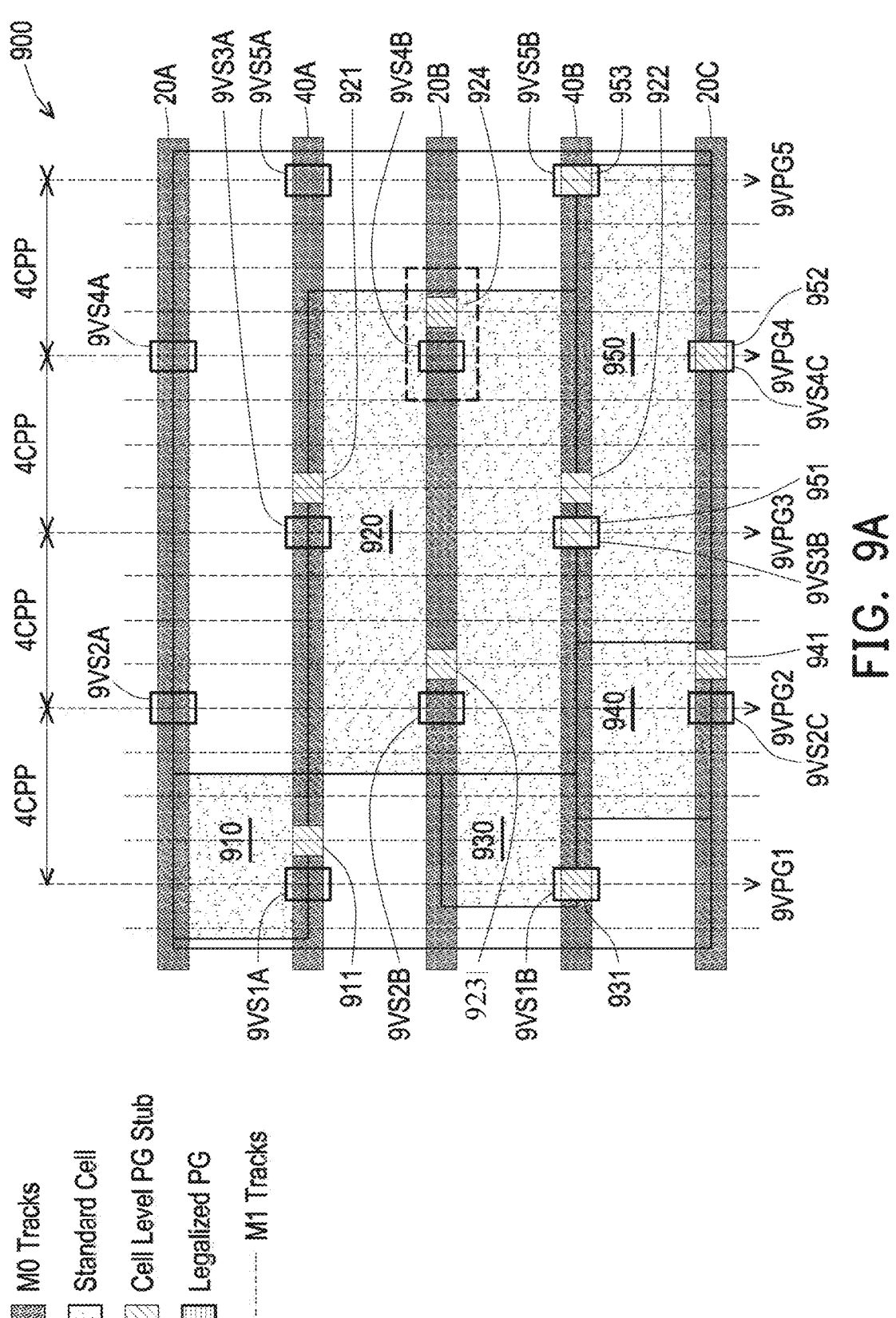
FIGS. 9A-9B are layout diagrams of an integrated circuit realized during a process of power grid legalization, in accordance with some embodiments.
Figure 9B:
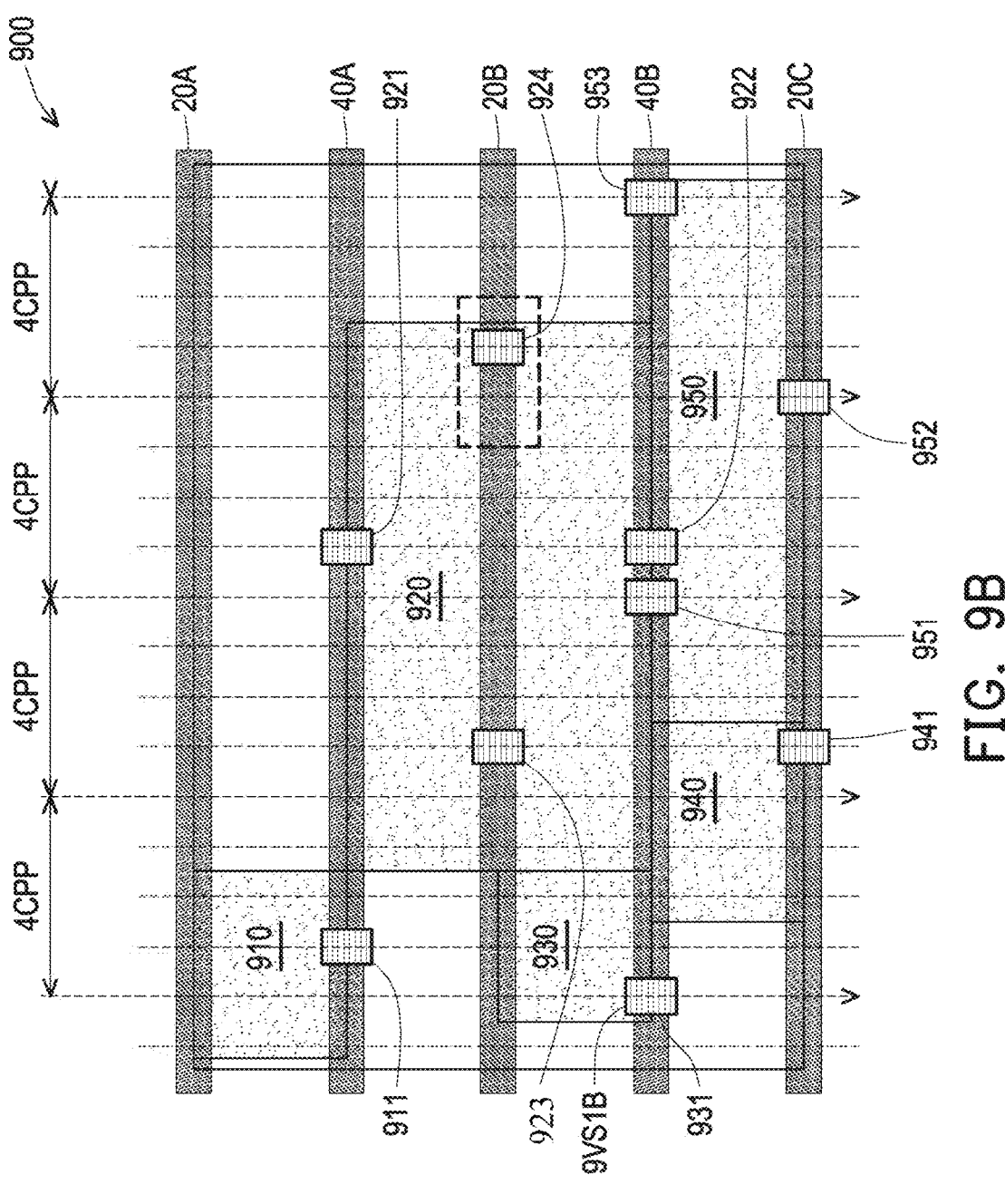

FIGS. 9A-9B are layout diagrams of an integrated circuit realized during a process of power grid legalization, in accordance with some embodiments. FIG. 9A is the layout diagram before the power grid legalization, and FIG. 9B is the layout diagram after the power grid legalization. In FIGS. 9A-9B, the integrated circuit 900 includes the circuit cells 910, 920, 930, 940, and 950. The circuit cell 910 is between power rails 20A and 40A. The circuit cell 920 is between power rails 40A and 40B. The circuit cell 930 is between power rails 20B and 40B. Each of the circuit cells 940 and 950 is between power rails 40B and 20C.

In FIG. 9A, virtual power grid stubs are placed in the layout diagram to guide the positioning of circuit cells during the process of power grid legalization. The layout diagram of FIG. 9A includes virtual power grid stubs 9VS2A and 9VS4A intersecting the power rail 20A, virtual power grid stubs 9VS2B and 9VS4B intersecting the power rail 20B, and virtual power grid stubs 9VS2C and 9VS4C intersect the power rail 20C. The layout diagram of FIG. 9A also includes virtual power grid stubs 9VS1A, 9VS3A, and 9VS5A intersecting the power rail 40A, and virtual power grid stubs 9VS1B, 9VS3B, and 9VS5B intersecting the power rail 40B.

Each of the virtual power grid stubs in FIG. 9A is aligned with one of the virtual power grid lines 9VPG1, 9VPG2, 9VPG3, 9VPG4, and 9VPG5. The virtual power grid stubs 9VS1A and 9VS1B are aligned with the virtual power grid line 9VPG1. The virtual power grid stubs 9VS2A, 9VS2B, and 9VS2C are aligned with the virtual power grid line 9VPG2. The virtual power grid stubs 9VS3A and 9VS3B are aligned with the virtual power grid line 9VPG3. The virtual power grid stubs 9VS4A, 9VS4B, and 9VS4C are aligned with the virtual power grid line 9VPG4. The virtual power grid stubs 9VS5A and 9VS5B are aligned with the virtual power grid line 9VPG5.

During the layout process, when a given circuit cell is placed in the layout design, the Automatic Placement and Routing ("APR") software attempts to adjust the position of the given circuit cell by either positioning a power grid stub in the given circuit cell at a same position of a virtual power grid stub or minimizing the horizontal distance between each power grid stub in the given circuit cell and one of the virtual power grid stubs.

In FIG. 9A, the power grid stub 911 of the circuit cell 910 is placed in the vicinity of the virtual power grid stub 9VS1A. the power grid stubs 921, 922, 923, and 924 of the circuit cell 920 are placed correspondingly in the vicinity of the virtual power grid stubs 9VS3A, 9VS3B, 9VS2B, and 9VS4B. The power grid stub 931 of the circuit cell 930 is placed at the same position as the virtual power grid stub 9VS1B. The power grid stub 941 of the circuit cell 940 is placed in the vicinity of the virtual power grid stub 9VS2C. The power grid stubs 951, 952, and 953 of the circuit cell 950 are placed correspondingly at the same position as one of the virtual power grid stubs 9VS3B, 9VS4C, and 9VS5B.

After the layout design of the FIG. 9A is checked for power grid legalization, each of the power grid stubs that satisfies the power grid legalization requirement is labeled as a legalized power grid stub, while each of the power grid stubs that does not satisfy the power grid legalization requirement is labeled as an illegal power grid stub. After power grid stubs in FIG. 9A are labeled based on the power grid legalization requirement, the resulting layout diagram is as shown in FIG. 9B. In FIG. 9B, the virtual power grid stubs which are shown in FIG. 9A are also removed. In the specific example of FIG. 9A, the power grid stubs 911, 921-924, 931, 941, and 951-953 are labeled as legalized power grid stubs.

In some embodiments, the integrated circuit 900 include vertical power grid lines (e.g., in metal layer M3) aligned with the virtual power grid lines (such as 9VPG1-9VPG5 in FIG. 9A), and each power grid stub is connected to one of the vertical power grid lines through a local routing line (which is similar to one of the local routing lines in FIG. 6). In some embodiments, whether a power grid stub satisfies the power grid legalization requirement depends upon whether the power grid stub is sufficiently near a corresponding virtual power grid stub such that a local routing line is available to connect the power grid stub to a vertical power grid line through a via-connector at the same position of the corresponding virtual power grid stub. For example, in FIG. 9A, if a local routing line extending horizontally overlaps with both the power grid stub 924 and the virtual power grid stub 9VS4B, then, a power grid stub satisfies the power grid legalization requirement, as the local routing line can be connected to the power grid stub 924 through a first via-connector and connected to a vertical power grid line through a second via-connector at the same position of the virtual power grid stub 9VS4B.

Figure 10:
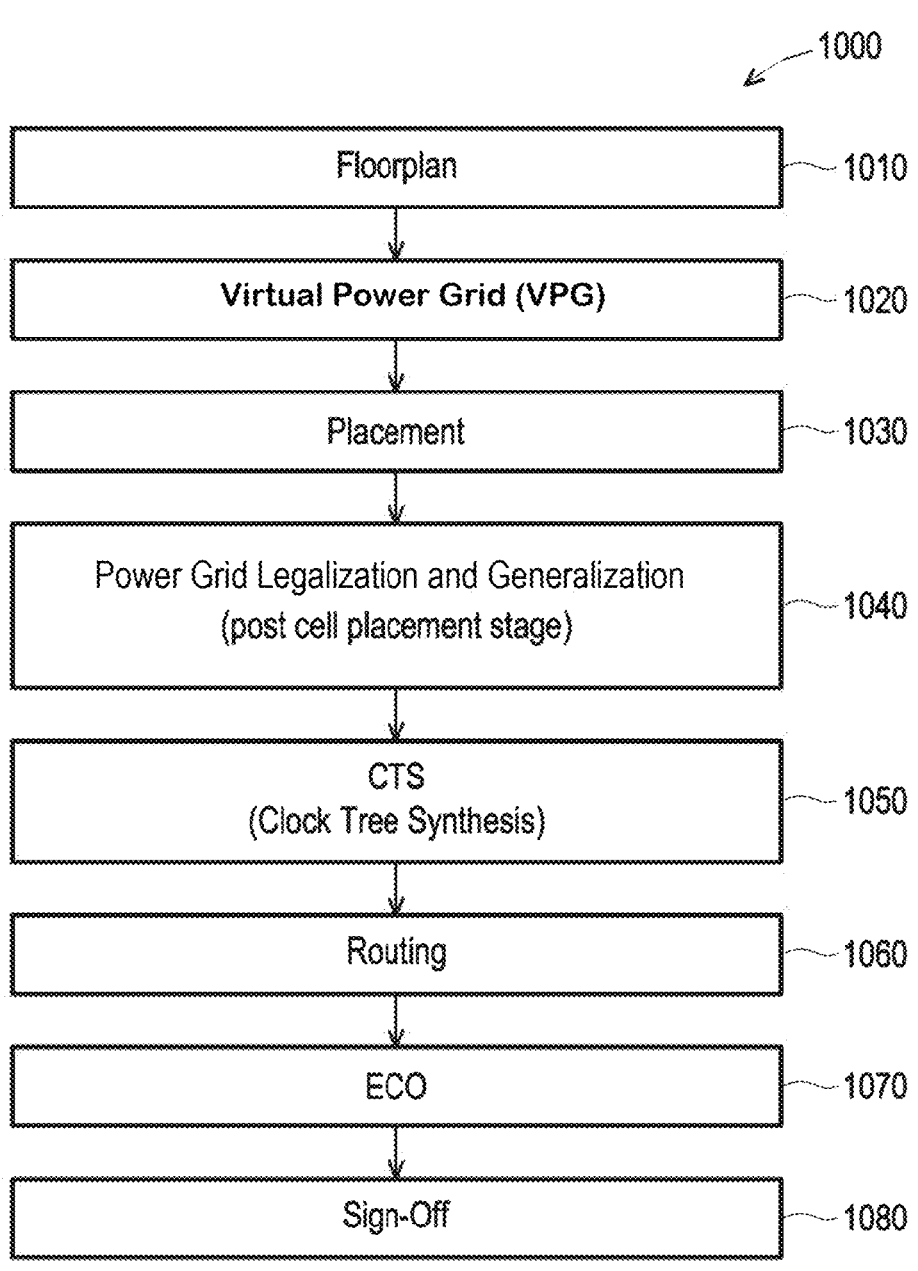
FIG. 10 is a flowchart of a method of creating a layout design with the assistance of virtual power grid stubs, in accordance with some embodiments.

FIG. 10 is a flowchart of a method 1000 of creating a layout design with the assistance of virtual power grid stubs, in accordance with some embodiments. The sequence in which the operations of method 1000 are depicted in FIG. 10 is for illustration only; the operations of method 1000 are capable of being executed in sequences that differ from that depicted in FIG. 10. It is understood that additional operations may be performed before, during, and/or after the method 1000 depicted in FIG. 10, and that some other processes may only be briefly described herein.

In operation 1010 of method 1000, a floorplan is generated. In some embodiments, the floorplan includes arrays of power rails, and each power rail extends in a first direction. In the example embodiments as shown in FIG. 5A and FIG. 6, the arrays of power rails include the power rails 20A-20D and 40A-40C. After operation 1010, virtual power grid lines are created on the floorplan in operation 1020. In the example embodiments as shown in FIG. 9A, the virtual power grid lines include 9VPG1-9VPG5. In operation 1020, virtual power grid stubs are also created and aligned with the virtual power grid lines. In the example embodiments as shown in FIG. 9A, the virtual power grid stubs 9VS1A-9VS1B, 9VS2A-9VS2C, 9VS3A-9VS3B, 9VS4A-9VS4C, and 9VS5A-9VS5B are created and correspondingly aligned with the virtual power grid lines 9VPG1-9VPG5. After operation 1020, the process proceeds to operation 1030.

In operation 1030 of method 1000, circuit cells are placed in the layout diagram. After the vertical positions of a given circuit cell is fixed relative to the power rails, the horizontal position of the given circuit cell is then adjusted. In some embodiments, during the adjustment of the horizontal position of the given circuit cell, the horizontal distances between the power grid stubs in the given circuit cell and the virtual power grid stubs are minimized. In the example of FIG. 9A, the vertical position of the circuit cell 910 is bounded by the power rails 20A and 40A, and the horizontal position of the circuit cell 910 is adjusted to satisfy other design considerations. After operation 1030, the process proceeds to operation 1040.

In operation 1040 of method 1000, for each given power grid stub that needs to be connected to a power grid line, the given power grid stub is checked for power grid legalization requirements. In some embodiments, the Automatic Place and Route ("APR") software for checking the power grid legalization requirements also makes further adjustment about the positions of one or more circuit cells, whereby increasing the number of the power grid stubs that satisfy the power grid legalization requirements. In the example embodiments as shown in FIGS. 9A-9B, each of the power grid stubs 911, 921-924, 931, 941, and 951-953 satisfies the power grid legalization requirements as determined by the APR software in operation 1040. After operation 1040, the process proceeds to operation 1050.

In operation 1050 of method 1000, clock tree synthesis is performed, whereby skew and insertion delay are minimized. Next, in operation 1060, during routing design, routing resources are allocated for connections and routing tracks are assigned for individual nets. After operation 1060, Engineering Change Order ("ECO") is performed in operation 1070, and some changes in logic of the IC circuits are made by modifying some metal and/or via masks as some ECO cells are modified. After operation 1070, sign-off process is performed in operation 1080.

Figure 11A:
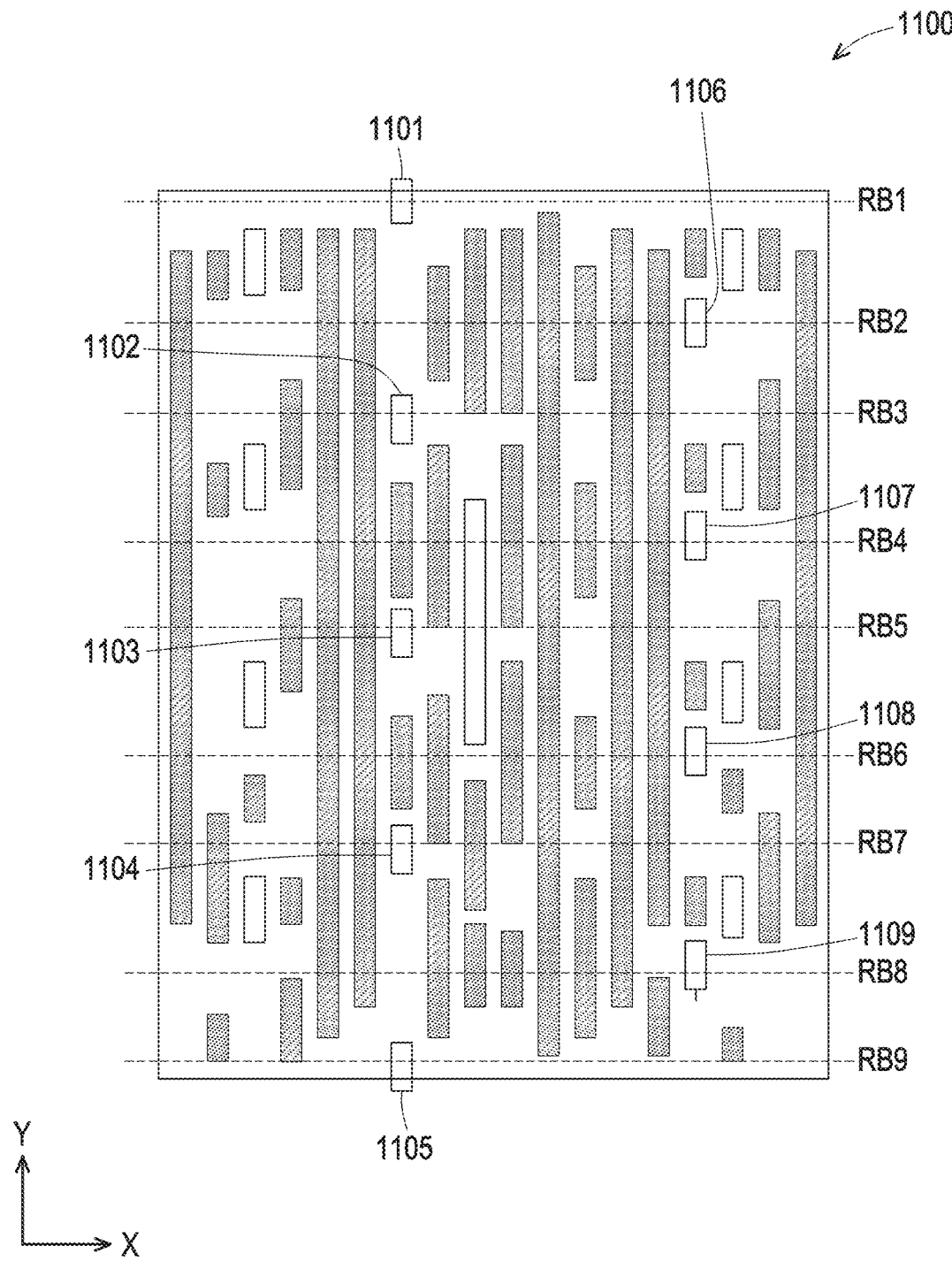
FIGS. 11A-11B are layout diagrams of an integrated circuit in the metal layer having power grid stubs and vertical conducting lines, in accordance with some embodiments.
Figure 11B:
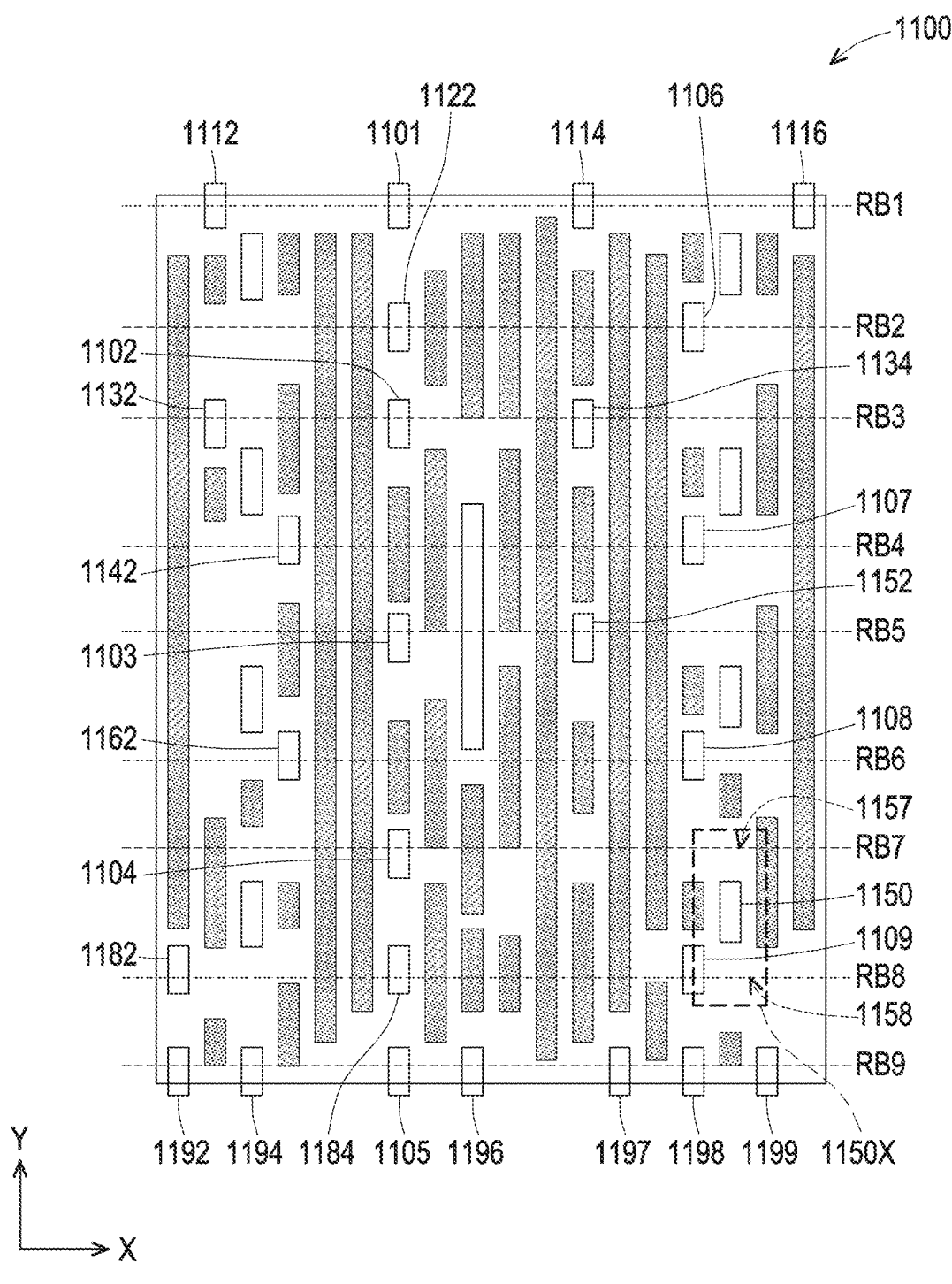

FIGS. 11A-11B are layout diagrams of an integrated circuit in the metal layer having power grid stubs and vertical conducting lines, in accordance with some embodiments. In FIG. 11A, the power grid stubs and the vertical conducting lines after circuit cells are placed in the layout diagram of the integrated circuit 1100 are depicted. The power grid stubs and the vertical conducting lines are fabricated a metal layer which overlies the interlayer dielectric that covers the horizontal conducting lines in the metal layer M0. In the example embodiments of FIGS. 2A-2C, the transistors in the integrated circuit 1100 are covered with an interlayer dielectric ILD0, while horizontal conducting lines extending in the X-direction are fabricated in a metal layer M0 which overlies the interlayer dielectric ILD0. The power grid stubs and the vertical conducting lines are fabricated a metal layer M1 which overlies the interlayer dielectric ILD1 that covers the horizontal conducting lines in the metal layer M0.

In FIG. 11A, power grid stubs 1101-1109 in circuit cells are shown at the row boundaries RB1-RB9 which identify the row alignments of circuit cells. The power grid stubs 1101, 1102, 1103, 1104, and 1105 are correspondingly positioned at the row boundaries RB1, RB3, RB5, RB7, and RB9. The power grid stubs 1106, 1107, 1108, and 1109 are correspondingly positioned at the row boundaries RB2, RB4, RB6, and RBB. During the layout design process, more APR-level power grid stubs are inserted into the layout diagram of the integrated circuit 1100 in the metal layer having the vertical conducting lines. As shown in FIG. 11B, each of the newly inserted power grid stubs is also positioned at one of the row boundaries RB1-RB9.

In FIG. 11B, the newly inserted power grid stubs include the power grid stubs 1112, 1114, and 1116 at the row boundary RB1, the power grid stub 1122 at the row boundary RB2, the power grid stubs 1132 and 1134 at the row boundary RB3, the power grid stub 1142 at the row boundary RB4, the power grid stub 1152 at the row boundary RB5, the power grid stub 1162 at the row boundary RB6, the power grid stubs 1182 and 1184 at the row boundary RB8, and the power grid stubs 1192, 1194, and 1196-1199 at the row boundary RB9. Each of the newly inserted power grid stubs needs to satisfy design rule cheek requirements. One of the design rules requires minimal spaces be maintained at each end of an input/output pin. For example, in FIG. 11B, the limitation box 1150X surrounding the input/output pin 1150 specifies the minimal spaces at each end of the input/output pin 1150. Because each of the row boundaries RB7 and RB8 intersects with the limitation box 1150X, inserting a power grid stub at the row boundary RB7 (near the end of the input/output pin 1150 identified by position 1157) would fail design rule check, and inserting a power grid stub at the row boundary RB8 (near the end of the input/output pin 1150 identified by position 1158) would also fail design rule check. Consequently, no power grid stub is inserted at position 1157 or position 1158.

FIG. 12 is a flowchart of a method 1200 of manufacturing an integrated circuit, in accordance with some embodiments. The sequence in which the operations of method 1200 are depicted in FIG. 12 is for illustration only; the operations of method 1200 are capable of being executed in sequences that differ from that depicted in FIG. 12. It is understood that additional operations may be performed before, during, and/or after the method 1200 depicted in FIG. 12, and that some other processes may only be briefly described herein.

In operation 1210 of method 1200, active-region structures extending in the X-direction are fabricated. In the example embodiments as shown in FIGS. 1A-1C and FIGS. 2A-2C, the active-region structures 82p, 82n, 84n, and 84p are formed on the substrate 30. Examples of the active-region structures include fin structures, nano-sheet structures, or nano-wire structures. Next, in the operation 1215 of method 1200, a first boundary isolation region and a second boundary isolation region are fabricated in each of the active-region structures. In the example embodiments as shown in FIGS. 1A-1C and FIGS. 2A-2C, the boundary isolation region 101ip and the boundary isolation region 109ip are fabricated in the active-region structure 82p, and the boundary isolation region 101in and the boundary isolation region 109in are fabricated in the active-region structure 82n. Then, in operation 1220 of method 1200, transistors are fabricated in the active-region structures between two vertical cell boundaries of a circuit cell. In the example embodiments as shown in FIGS. 1A-1C and FIGS. 2A-2C, transistors are formed when the gate-conductors and the terminal-conductors intersecting the active-region structures (e.g., 82p, 82n) are fabricated between the vertical cell boundaries 101 and 109 of the circuit cell 100. After operation 1220, the process proceeds to operation 1230.

In operation 1230 of method 1200, a first power rail and a second power rail are formed in a first metal layer. In the example embodiments as shown in FIGS. 1A-1C and FIGS. 2A-2C, the power rail 20A and the power rail 40A extending in the X-direction are fabricated in a metal layer M0 which overlies the interlayer dielectric that covers the gate-conductors and the terminal-conductors. The power rail 20A and the power rail 40A are correspondingly configured to provide power supply voltages VDD and VSS to the circuit cell 100. After operation 1230, the process proceeds to operation 1240.

In operation 1240 of method 1200, vertical conducting lines and power grid stubs are fabricated in a second metal layer and a first power grid stub is conductively connected to the first power rail are formed. In the example embodiments as shown in FIGS. 1A-1C and FIGS. 2A-2C, the vertical conducting lines (1*m*1-1*m*2, 1*m*3A-1*m*3B, 1*m*4-1*m*9, 1*m*10A-1*m*10B, and 1*m*11) are fabricated in a metal layer M1 which overlies the interlayer dielectric ILD1 that covers the power rails 20A and 40A. Each of the vertical conducting lines (e.g., 1*m*3A or 1*m*3B) extends in the Y-direction between the vertical cell boundaries 101 and 109 of the circuit cell 100. The power grid stubs (1ST3A-1ST3C and 1ST10A-1ST10C) are also fabricated in the metal layer M1. The power grid stub 1ST3A is connected to the power rails 20A though a first via-connector passing through the interlayer dielectric ILD1, and the power grid stub 1ST3B is connected to the power rails 40A though a second via-connector passing through the interlayer dielectric ILD1.

Figure 13:
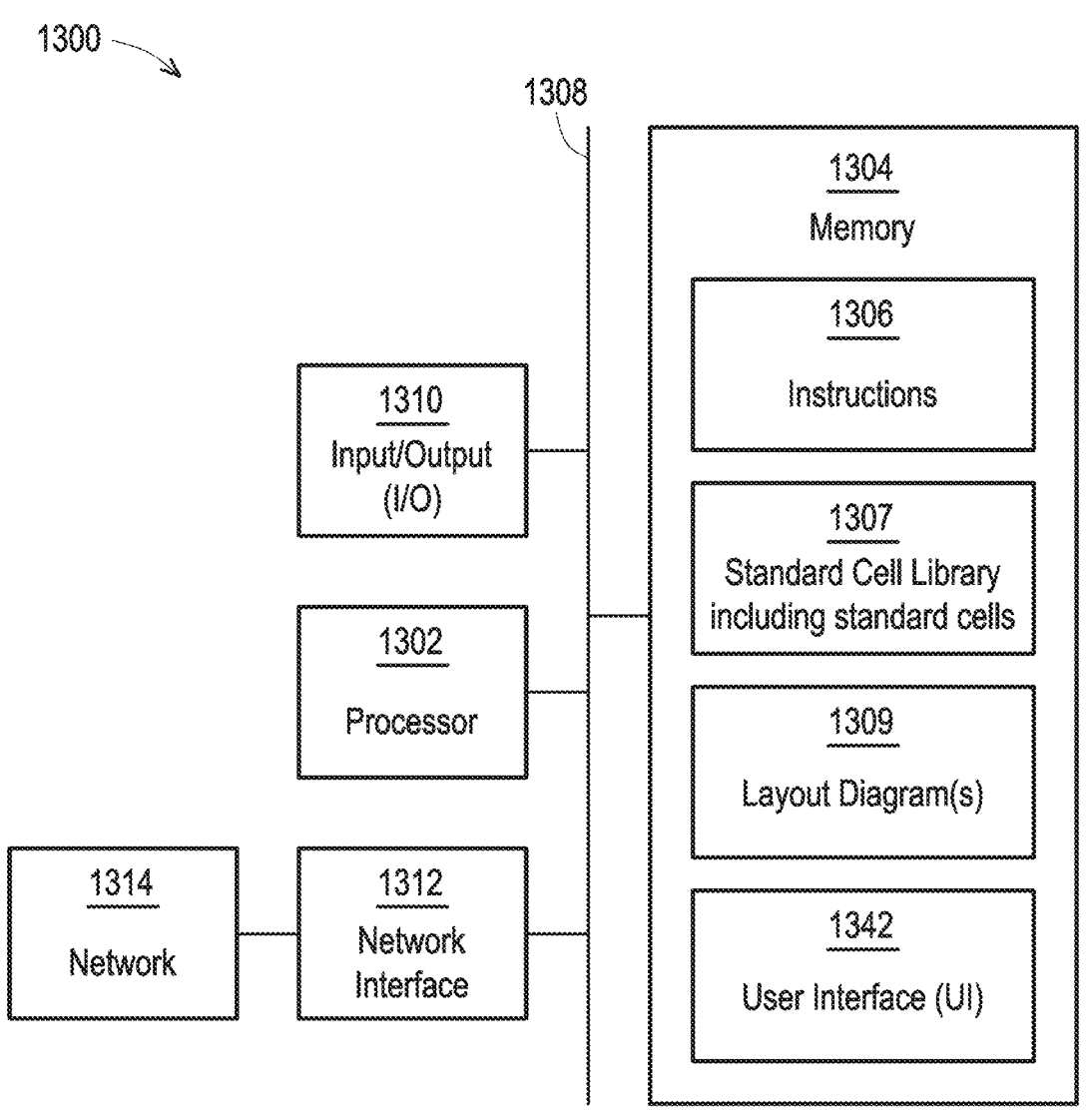
FIG. 13 is a block diagram of an electronic design automation (EDA) system in accordance with some embodiments.

FIG. 13 is a block diagram of an electronic design automation (EDA) system 1300 in accordance with some embodiments.

In some embodiments, EDA system 1300 includes an APR system. Methods described herein of designing layout diagrams represent wire routing arrangements, in accordance with one or more embodiments, are implementable, for example, using EDA system 1300, in accordance with some embodiments.

In some embodiments, EDA system 1300 is a general purpose computing device including a hardware processor 1302 and a non-transitory, computer-readable storage medium 1304. Storage medium 1304, amongst other things, is encoded with, i.e., stores, computer program code 1306, i.e., a set of executable instructions. Execution of instructions 1306 by hardware processor 1302 represents (at least in part) an EDA tool which implements a portion or all of the methods described herein in accordance with one or more embodiments (hereinafter, the noted processes and/or methods).

Processor 1302 is electrically coupled to computer-readable storage medium 1304 via a bus 1308. Processor 1302 is also electrically coupled to an I/O interface 1310 by bus 1308. A network interface 1312 is also electrically connected to processor 1302 via bus 1308. Network interface 1312 is connected to a network 1314, so that processor 1302 and computer-readable storage medium 1304 are capable of connecting to external elements via network 1314. Processor 1302 is configured to execute computer program code 1306 encoded in computer-readable storage medium 1304 in order to cause system 1300 to be usable for performing a portion or all of the noted processes and/or methods. In one or more embodiments, processor 1302 is a central processing unit (CPU), a multi-processor, a distributed processing system, an application specific integrated circuit (ASIC), and/or a suitable processing unit.

In one or more embodiments, computer-readable storage medium 1304 is an electronic, magnetic, optical, electromagnetic, infrared, and/or a semiconductor system (or apparatus or device). For example, computer-readable storage medium 1304 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1304 includes a compact disk-read only memory (CD-ROM), a compact disk-read/write (CD-R/W), and/or a digital video disc (DVD).

In one or more embodiments, storage medium 1304 stores computer program code 1306 configured to cause system 1300 (where such execution represents (at least in part) the EDA tool) to be usable for performing a portion or all of the noted processes and/or methods. In one or more embodiments, storage medium 1304 also stores information which facilitates performing a portion or all of the noted processes and/or methods. In one or more embodiments, storage medium 1304 stores library 1307 of standard cells including such standard cells as disclosed herein. In one or more embodiments, storage medium 1304 stores one or more layout diagrams 1309 corresponding to one or more layouts disclosed herein.

EDA system 1300 includes I/O interface 1310. I/O interface 1310 is coupled to external circuitry. In one or more embodiments, I/O interface 1310 includes a keyboard, keypad, mouse, trackball, trackpad, touchscreen, and/or cursor direction keys for communicating information and commands to processor 1302.

EDA system 1300 also includes network interface 1312 coupled to processor 1302. Network interface 1312 allows system 1300 to communicate with network 1314, to which one or more other computer systems are connected. Network interface 1312 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1300.

System 1300 is configured to receive information through I/O interface 1310. The information received through I/O interface 1310 includes one or more of instructions, data, design rules, libraries of standard cells, and/or other parameters for processing by processor 1302. The information is transferred to processor 1302 via bus 1308. EDA system 1300 is configured to receive information related to a UI through I/O interface 1310. The information is stored in computer-readable medium 1304 as user interface (UI) 1342.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1300. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 14:
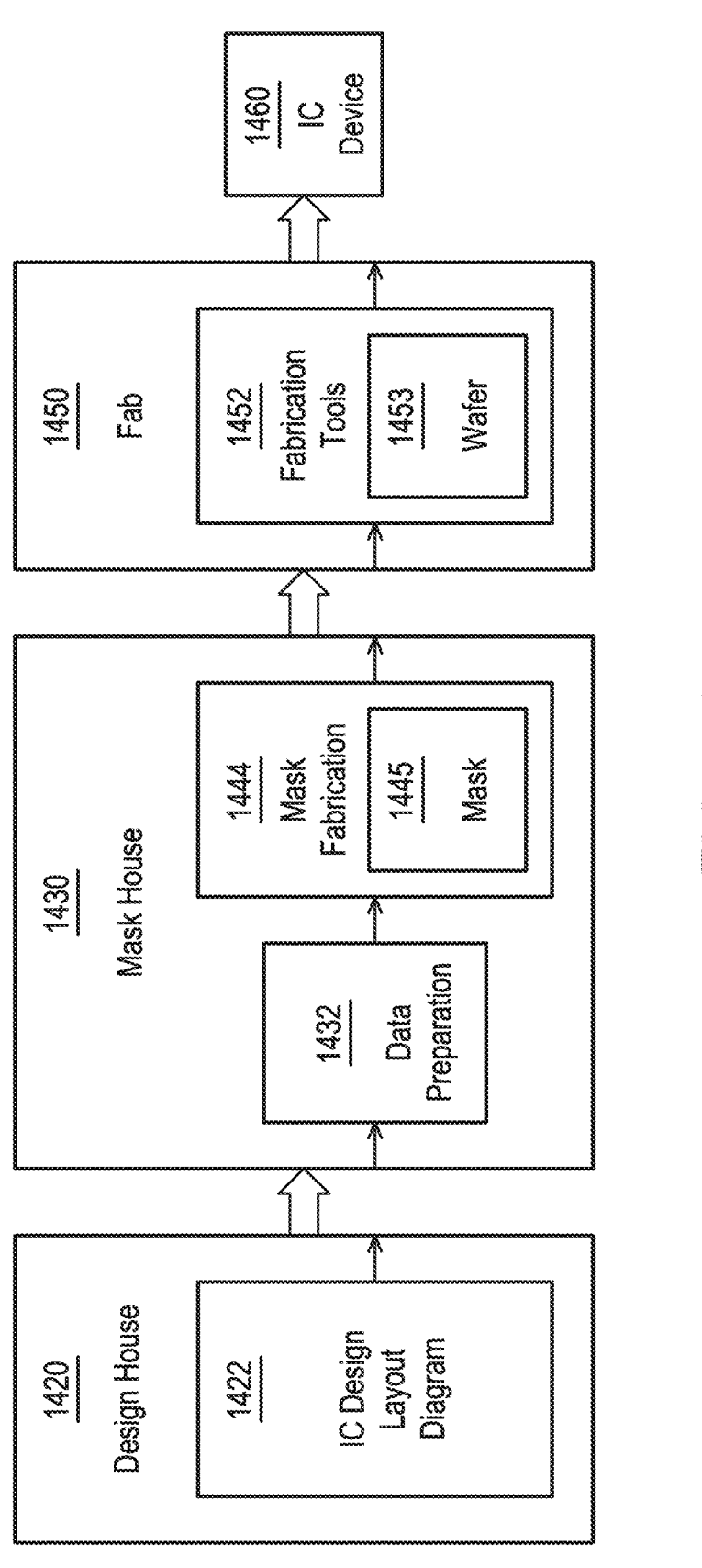
FIG. 14 is a block diagram of an integrated circuit (IC) manufacturing system, and an IC manufacturing flow associated therewith, in accordance with some embodiments.

FIG. 14 is a block diagram of an integrated circuit (IC) manufacturing system 1400, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1400.

In FIG. 14, IC manufacturing system 1400 includes entities, such as a design house 1420, a mask house 1430, and an IC manufacturer/fabricator ("fab") 1450, that interact with one another in the design, development, and manufacturing cycles and/or services related to manufacturing an IC device 1460. The entities in system 1400 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1420, mask house 1430, and IC fab 1450 is owned by a single larger company. In some embodiments, two or more of design house 1420, mask house 1430, and IC fab 1450 coexist in a common facility and use common resources.

Design house (or design team) 1420 generates an IC design layout diagram 1422. IC design layout diagram 1422 includes various geometrical patterns designed for an IC device 1460. The geometrical patterns correspond to patterns of metal, oxide, or semiconductor layers that make up the various components of IC device 1460 to be fabricated. The various layers combine to form various IC features. For example, a portion of IC design layout diagram 1422 includes various IC features, such as an active region, gate electrode, source and drain, metal lines or vias of an inter-layer interconnection, and openings for bonding pads, to be formed in a semiconductor substrate (such as a silicon wafer) and various material layers disposed on the semiconductor substrate. Design house 1420 implements a proper design procedure to form IC design layout diagram 1422. The design procedure includes one or more of logic design, physical design or place and route. IC design layout diagram 1422 is presented in one or more data files having information of the geometrical patterns. For example, IC design layout diagram 1422 can be expressed in a GDSII file format or DFII file format.

Mask house 1430 includes data preparation 1432 and mask fabrication 1444. Mask house 1430 uses IC design layout diagram 1422 to manufacture one or more masks 1445 to be used for fabricating the various layers of IC device 1460 according to IC design layout diagram 1422. Mask house 1430 performs mask data preparation 1432, where IC design layout diagram 1422 is translated into a representative data file ("RDF"). Mask data preparation 1432 provides the RDF to mask fabrication 1444. Mask fabrication 1444 includes a mask writer. A mask writer converts the RDF to an image on a substrate, such as a mask (reticle) 1445 or a semiconductor wafer 1453. The design layout diagram 1422 is manipulated by mask data preparation 1432 to comply with particular characteristics of the mask writer and/or requirements of IC fab 1450. In FIG. 14, mask data preparation 1432 and mask fabrication 1444 are illustrated as separate elements. In some embodiments, mask data preparation 1432 and mask fabrication 1444 can be collectively referred to as mask data preparation.

In some embodiments, mask data preparation 1432 includes optical proximity correction (OPC) which uses lithography enhancement techniques to compensate for image errors, such as those that can arise from diffraction, interference, other process effects and the like. OPC adjusts IC design layout diagram 1422. In some embodiments, mask data preparation 1432 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1432 includes a mask rule checker (MRC) that checks the IC design layout diagram 1422 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1422 to compensate for limitations during mask fabrication 1444, which may undo part of the modifications performed by OPC in order to meet mask creation rules.

In some embodiments, mask data preparation 1432 includes lithography process checking (LPC) that simulates processing that will be implemented by IC fab 1450 to fabricate IC device 1460. LPC simulates this processing based on IC design layout diagram 1422 to create a simulated manufactured device, such as IC device 1460. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1422.

It should be understood that the above description of mask data preparation 1432 has been simplified for the purposes of clarity. In some embodiments, data preparation 1432 includes additional features such as a logic operation (LOP) to modify the IC design layout diagram 1422 according to manufacturing rules. Additionally, the processes applied to IC design layout diagram 1422 during data preparation 1432 may be executed in a variety of different orders.

After mask data preparation 1432 and during mask fabrication 1444, a mask 1445 or a group of masks 1445 are fabricated based on the modified IC design layout diagram 1422. In some embodiments, mask fabrication 1444 includes performing one or more lithographic exposures based on IC design layout diagram 1422. In some embodiments, an electron-beam (e-beam) or a mechanism of multiple e-beams is used to form a pattern on a mask (photomask or reticle) 1445 based on the modified IC design layout diagram 1422. Mask 1445 can be formed in various technologies. In some embodiments, mask 1445 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1445 includes a transparent substrate (e.g., fused quartz) and an opaque material (e.g., chromium) coated in the opaque regions of the binary mask. In another example, mask 1445 is formed using a phase shift technology. In a phase shift mask (PSM) version of mask 1445, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1444 is used in a variety of processes. For example, such a mask(s) is used in an ion implantation process to form various doped regions in semiconductor wafer 1453, in an etching process to form various etching regions in semiconductor wafer 1453, and/or in other suitable processes.

IC fab 1450 is an IC fabrication business that includes one or more manufacturing facilities for the fabrication of a variety of different IC products. In some embodiments, IC Fab 1450 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1450 includes fabrication tools 1452 configured to execute various manufacturing operations on semiconductor wafer 1453 such that IC device 1460 is fabricated in accordance with the mask(s), e.g., mask 1445. In various embodiments, fabrication tools 1452 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1450 uses mask(s) 1445 fabricated by mask house 1430 to fabricate IC device 1460. Thus, IC fab 1450 at least indirectly uses IC design layout diagram 1422 to fabricate IC device 1460. In some embodiments, semiconductor wafer 1453 is fabricated by IC fab 1450 using mask(s) 1445 to form IC device 1460. In some embodiments, the IC fabrication includes performing one or more lithographic exposures based at least indirectly on IC design layout diagram 1422. Semiconductor wafer 1453 includes a silicon substrate or other proper substrate having material layers formed thereon. Semiconductor wafer 1453 further includes one or more of various doped regions, dielectric features, multilevel interconnects, and the like (formed at subsequent manufacturing steps).

An aspect of the present disclosure relates to an integrated circuit. The integrated circuit includes a first-type active-region structure and a second-type active-region structure extending in a first direction, a first boundary isolation region in each of the first-type active-region structure and the second-type active-region structure, and a second boundary isolation region in each of the first-type active-region structure and the second-type active-region structure. The first boundary isolation region in the first-type active-region structure and the first boundary isolation region in the second-type active-region structure delineates a first vertical cell boundary that intersects each of the first boundary isolation region in the first-type active-region structure and the first boundary isolation region in the second-type active-region structure and extends along a second direction perpendicular to the first direction. The second boundary isolation region in the first-type active-region structure and the second boundary isolation region in the second-type active-region structure delineates a second vertical cell boundary that intersects each of the second boundary isolation region in the first-type active-region structure and the second boundary isolation region in the second-type active-region structure and extends along the second direction. The integrated circuit further includes a first power rail and a second power rail extending in the first direction, a first power grid stub connected to the first power rail through a first via-connector, and a first vertical conducting line extending in the second direction in a circuit cell between the first vertical cell boundary and the second vertical cell boundary. The first vertical conducting line and the first power grid stub are in a same metal layer and aligned with each other along the second direction.

Another aspect of the present disclosure also relates to an integrated circuit. The integrated circuit includes a first power rail and a second power rail in a first metal layer. Each of the first power rail and the second power rail extends in a first direction that is perpendicular to a second direction. The integrated circuit also includes a first-type active-region structure and a second-type active-region structure extending in the first direction, a first boundary isolation region in each of the first-type active-region structure and the second-type active-region structure, and a second boundary isolation region in each of the first-type active-region structure and the second-type active-region structure. The first boundary isolation region in the first-type active-region structure and the first boundary isolation region in the second-type active-region structure delineates a first vertical cell boundary that intersects each of the first boundary isolation region in the first-type active-region structure and the first boundary isolation region in the second-type active-region structure and extends along the second direction. The second boundary isolation region in the first-type active-region structure and the second boundary isolation region in the second-type active-region structure delineates a second vertical cell boundary that intersects each of the second boundary isolation region in the first-type active-region structure and the second boundary isolation region in the second-type active-region structure and extends along the second direction. The integrated circuit further includes a first vertical conducting line and a second vertical conducting line in a second metal layer. The first vertical conducting line and the second vertical conducting line extend in the second direction between the first vertical cell boundary and the second vertical cell boundary of a circuit cell. The integrated circuit further includes a first power grid stub in the second metal layer and connected to the first power rail through a first via-connector. The first power grid stub is aligned with the first vertical conducting line along the second direction.

Another aspect of the present disclosure relates to a method of fabricating an integrated circuit. The method includes fabricating an active-region structure extending in a first direction, fabricating a first boundary isolation region and a second boundary isolation region in the active-region structure, and fabricating transistors in the active-region structures between the first boundary isolation region and the second boundary isolation region. The method also includes forming a first power rail and a second power rail in a first metal layer. Each of the first power rail and the second power rail extends in the first direction. The method further includes fabricating vertical conducting lines and power grid stubs in a second metal layer. Each of the vertical conducting lines extends in a second direction perpendicular to the first direction. A first power grid stub is connected to the first power rail through a first via-connector. A first vertical conducting line is aligned along the second direction with the first power grid stub and crosses over the active-region structure between the first boundary isolation region and the second boundary isolation region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
  a first-type active-region structure and a second-type active-region structure extending in a first direction on a substrate;
  a first boundary isolation region in each of the first-type active-region structure and the second-type active-region structure;

a second boundary isolation region in each of the first-type active-region structure and the second-type active-region structure;

wherein the first boundary isolation region in the first-type active-region structure and the first boundary isolation region in the second-type active-region structure delineates a first vertical cell boundary which specifies a first hypothetical plane perpendicular to the substrate, the first hypothetical plane intersecting each of the first boundary isolation region in the first-type active-region structure and the first boundary isolation region in the second-type active-region structure and extends along a second direction perpendicular to the first direction;

wherein the second boundary isolation region in the first-type active-region structure and the second boundary isolation region in the second-type active-region structure delineates a second vertical cell boundary which specifies a second hypothetical plane perpendicular to the substrate, the second hypothetical plane intersecting each of the second boundary isolation region in the first-type active-region structure and the second boundary isolation region in the second-type active-region structure and extends along the second direction;

a first power rail and a second power rail extending in the first direction;

a first power grid stub connected to the first power rail through a first via-connector; and a first vertical conducting line extending in the second direction in a circuit cell between the first hypothetical plane specified by the first vertical cell boundary and the second hypothetical plane specified by the second vertical cell boundary, wherein the first vertical conducting line and the first power grid stub are in a same metal layer and aligned with each other along the second direction.

2. The integrated circuit of claim 1, further comprising:

a second power grid stub connected to the second power rail through a second via-connector, wherein the second power grid stub is aligned with the first vertical conducting line along the second direction and are in the same metal layer that contains the first vertical conducting line and the first power grid stub.

3. The integrated circuit of claim 2, further comprising:

a third power rail extending in the first direction; and a third power grid stub connected to the third power rail through a third via-connector, wherein the third power grid stub is aligned with the first vertical conducting line along the second direction and are in the same metal layer that contains the first vertical conducting line and the first power grid stub.

4. The integrated circuit of claim 1, further comprising:

a second power grid stub connected to the second power rail through a second via-connector; and a second vertical conducting line extending in the second direction in the circuit cell between the first vertical cell boundary and the second vertical cell boundary, wherein the second vertical conducting line and the second power grid stub are aligned with each other along the second direction and are in the same metal layer that contains the first power grid stub.

5. The integrated circuit of claim 1, further comprising:

a power grid strip connected to the second power rail, wherein the power grid strip extends in the second direction in the circuit cell between the first vertical cell boundary and the second vertical cell boundary, and wherein the power grid strip is in the same metal layer that contains the first power grid stub.

6. The integrated circuit of claim 1, further comprising:

a plurality of horizontal conducting lines extending in the first direction between the first power rail and the second power rail, wherein the horizontal conducting lines are in the same metal layer as the first power rail and the second power rail.

7. An integrated circuit comprising:

a first-type active-region structure and a second-type active-region structure extending in a first direction on a substrate;

a first boundary isolation region in each of the first-type active-region structure and the second-type active-region structure;

a second boundary isolation region in each of the first-type active-region structure and the second-type active-region structure;

a first power rail and a second power rail extending in a first direction in a first metal layer;

a first power grid stub connected to the first power rail through a first via-connector;

a first vertical conducting line extending in a second direction in a circuit cell between a first hypothetical plane specified by a first vertical cell boundary and a second hypothetical plane specified by a second vertical cell boundary, wherein each of the first hypothetical plane and the second hypothetical plane is perpendicular to the substrate, wherein the first vertical conducting line and the first power grid stub are in a second metal layer and aligned with each other along the second direction, and wherein the second direction is perpendicular to the first direction;

wherein the first hypothetical plane specified by the first vertical cell boundary passes through the first boundary isolation region in the first-type active-region structure and the first boundary isolation region in the second-type active-region structure; and wherein the second hypothetical plane specified by the second vertical cell boundary passes through the second boundary isolation region in the first-type active-region structure and the second boundary isolation region in the second-type active-region structure.

8. The integrated circuit of claim 7, further comprising:

a second power grid stub connected to the second power rail through a second via-connector, wherein the second power grid stub is in the second metal layer and aligned with the first vertical conducting line along the second direction.

9. The integrated circuit of claim 8, further comprising:

a third power rail extending in the first direction in the first metal layer; and a third power grid stub connected to the third power rail through a third via-connector, wherein the third power grid stub is in the second metal layer and aligned with the first vertical conducting line along the second direction.

10. The integrated circuit of claim 7, further comprising:

a second power grid stub connected to the second power rail through a second via-connector.

11. The integrated circuit of claim 7, further comprising:

a power grid strip connected to the second power rail, wherein the power grid strip extends in the second direction in the circuit cell between the first vertical cell boundary and the second vertical cell boundary, and wherein the power grid strip is in the second metal layer.

12. The integrated circuit of claim 7, further comprising:

a plurality of horizontal conducting lines extending in the first direction between the first power rail and the second power rail, wherein the horizontal conducting lines are in first metal layer.

13. An integrated circuit comprising:

a first-type active-region structure and a second-type active-region structure extending in a first direction on a substrate;

a first power rail and a second power rail extending in a first direction in a first metal layer;

a first power grid stub and a second power grid stub in a second metal layer;

a first via-connector directly connected between the first power grid stub and the first power rail;

a second via-connector directly connected between the second power grid stub and the second power rail;

a first vertical conducting line extending in a second direction in the second metal layer and aligned with the first power grid stub along the second direction, wherein the first vertical conducting line is between a first hypothetical plane perpendicular to the substrate and a second hypothetical plane perpendicular to the substrate, wherein the first hypothetical plane is specified by a first vertical cell boundary of a circuit cell and the second hypothetical plane is specified by a second vertical cell boundary of the circuit cell, and wherein the second direction is perpendicular to the first direction;

a first boundary isolation region in each of the first-type active-region structure and the second-type active-region structure;

a second boundary isolation region in each of the first-type active-region structure and the second-type active-region structure;

wherein the first hypothetical plane specified by the first vertical cell boundary passes through the first boundary isolation region in the first-type active-region structure and the first boundary isolation region in the second-type active-region structure; and wherein the second hypothetical plane specified by the second vertical cell boundary passes through the second boundary isolation region in the first-type active-region structure and the second boundary isolation region in the second-type active-region structure.

14. The integrated circuit of claim 13, wherein the second power grid stub is aligned with the first vertical conducting line along the second direction.

15. The integrated circuit of claim 13, further comprising:

a second vertical conducting line extending in the second direction in the second metal layer and aligned with the second power grid stub along the second direction between the first vertical cell boundary and the second vertical cell boundary of a circuit cell.

16. The integrated circuit of claim 13, further comprising:

a third power rail extending in the first direction in the first metal layer; and a third power grid stub in the second metal layer.

17. The integrated circuit of claim 16, wherein the third power grid stub is aligned with the first vertical conducting line along the second direction.

18. The integrated circuit of claim 13, further comprising:

a plurality of horizontal conducting lines extending in the first direction between the first power rail and the second power rail, wherein the horizontal conducting lines are in first metal layer.

19. The integrated circuit of claim 10, further comprising:

a second vertical conducting line extending in the second direction in the circuit cell between the first vertical cell boundary and the second vertical cell boundary, wherein the second vertical conducting line and the second power grid stub are in the second metal layer and aligned with each other along the second direction.

20. The integrated circuit of claim 16, further comprising:

a third via-connector directly connected between the third power grid stub and third first power rail.

* * * * *